US012088753B2

(12) United States Patent
Kim

(10) Patent No.: US 12,088,753 B2
(45) Date of Patent: Sep. 10, 2024

(54) METHOD AND APPARATUS FOR PROVIDING CONTENT

(71) Applicant: SAMSUNG ELECTRONICS CO., LTD., Suwon-si (KR)

(72) Inventor: Young-jae Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/113,389

(22) Filed: Feb. 23, 2023

(65) Prior Publication Data
US 2023/0199106 A1 Jun. 22, 2023

Related U.S. Application Data

(63) Continuation of application No. 16/811,412, filed on Mar. 6, 2020, now Pat. No. 11,595,508, which is a
(Continued)

(30) Foreign Application Priority Data

Mar. 18, 2014 (KR) .................. 10-2014-0031823
Oct. 27, 2014 (KR) .................. 10-2014-0146429

(51) Int. Cl.
G06F 3/048 (2013.01)
G06F 3/0481 (2022.01)
(Continued)

(52) U.S. Cl.
CPC ...... H04M 1/72436 (2021.01); G06F 3/0481 (2013.01); G06F 3/0488 (2013.01);
(Continued)

(58) Field of Classification Search
CPC ... G06F 3/0481; G06F 3/0488; G06Q 10/107; G06Q 50/01; H04W 4/12; H04M 1/72451; H04M 1/72436
See application file for complete search history.

(56) References Cited

U.S. PATENT DOCUMENTS 5,880,731 A * 3/1999 Liles ..................... G06F 3/0481
345/473
6,014,136 A * 1/2000 Ogasawara ......... H04L 12/1827
709/205
(Continued)

FOREIGN PATENT DOCUMENTS

KR 10-2010-0104063 A 9/2010
KR 10-2010-0126052 A 12/2010
(Continued)

OTHER PUBLICATIONS

Communication dated Apr. 12, 2021 issued by the Korean Intellectual Property Office in Korean application No. 10-2014-0146429.
(Continued)

Primary Examiner — Nicholas Augustine
(74) Attorney, Agent, or Firm — Sughrue Mion, PLLC

(57) ABSTRACT

A method of providing content in a terminal includes obtaining a first message that is input through a user interface of the terminal that is provided by a messaging application that executes a messaging service in the terminal; generating content based on the first message, and a second message stored in the terminal; and providing the generated content via the terminal.

12 Claims, 41 Drawing Sheets

Related U.S. Application Data continuation of application No. 14/660,444, filed on Mar. 17, 2015, now Pat. No. 10,587,745.

(51) Int. Cl.

| | | |
|---|---|---|
| *G06F 3/0488* | (2022.01) | |
| *G06Q 10/107* | (2023.01) | |
| *G06Q 50/00* | (2012.01) | |
| *H04M 1/72436* | (2021.01) | |
| *H04W 4/12* | (2009.01) | |
| *G06F 3/01* | (2006.01) | |
| *H04M 1/72451* | (2021.01) | |

(52) U.S. Cl.
CPC .......... *G06Q 10/107* (2013.01); *G06Q 50/01* (2013.01); *H04W 4/12* (2013.01); *H04M 1/72451* (2021.01)

(56) References Cited

U.S. PATENT DOCUMENTS

| | | | | |
|---|---|---|---|---|
| 6,760,410 | B1* | 7/2004 | Lee ............... | H04M 1/2473 379/915 |
| 7,219,302 | B1* | 5/2007 | O'Shaughnessy .. | G06F 3/04817 715/752 |
| 7,752,553 | B2* | 7/2010 | Pennington ........... | G06Q 10/10 715/201 |
| 7,814,155 | B2* | 10/2010 | Buchheit ............... | G06F 3/0482 709/206 |
| 8,032,470 | B1* | 10/2011 | Heidenreich ........... | G06N 5/04 706/45 |
| 8,538,895 | B2* | 9/2013 | Appelman ............. | G06Q 50/01 705/319 |
| 2001/0048449 | A1* | 12/2001 | Baker ................. | H04L 12/1818 709/204 |
| 2002/0059098 | A1* | 5/2002 | Sazawa ............. | G06Q 30/0601 705/26.1 |
| 2002/0123359 | A1* | 9/2002 | Wei .......................... | H04L 67/04 455/414.4 |
| 2002/0130904 | A1* | 9/2002 | Becker .................. | G06F 3/0481 715/753 |
| 2003/0030670 | A1* | 2/2003 | Duarte ................... | G06Q 10/10 715/758 |
| 2003/0065721 | A1* | 4/2003 | Roskind .................. | H04L 51/04 709/204 |
| 2003/0088623 | A1* | 5/2003 | Kusuda .................... | H04L 51/04 709/204 |
| 2003/0090518 | A1* | 5/2003 | Chien ............... | H04M 3/42382 715/758 |
| 2003/0105815 | A1* | 6/2003 | Gusler .................... | H04L 51/04 709/224 |
| 2003/0187925 | A1* | 10/2003 | Inala ........................ | G06F 21/41 709/204 |
| 2004/0078446 | A1* | 4/2004 | Daniell ................... | H04L 69/08 709/204 |
| 2005/0114789 | A1* | 5/2005 | Chang .................. | G06F 3/0481 715/810 |
| 2005/0204306 | A1* | 9/2005 | Kawahara .............. | G06F 3/0481 715/767 |
| 2005/0210181 | A1* | 9/2005 | Depke ................. | G06F 3/04842 711/100 |
| 2005/0289220 | A1 | 12/2005 | Chen et al. | |
| 2006/0031772 | A1* | 2/2006 | Valeski ................. | G06F 3/0481 715/751 |
| 2008/0010654 | A1 | 1/2008 | Barrett et al. | |
| 2008/0040683 | A1* | 2/2008 | Walsh ................. | G06F 3/04855 715/781 |
| 2008/0140523 | A1* | 6/2008 | Mahoney ............. | G11B 27/105 705/26.1 |
| 2008/0201638 | A1* | 8/2008 | Nair ...................... | H04W 4/029 715/706 |
| 2008/0209339 | A1* | 8/2008 | Macadaan .......... | G06Q 30/0271 715/745 |
| 2008/0209351 | A1* | 8/2008 | Macadaan ........... | G06F 16/9535 715/762 |
| 2009/0063995 | A1* | 3/2009 | Baron ................. | H04N 7/17318 715/753 |
| 2009/0079871 | A1 | 3/2009 | Hua et al. | |
| 2009/0271486 | A1 | 10/2009 | Ligh et al. | |
| 2009/0313299 | A1* | 12/2009 | Bonev ................... | G06F 16/285 |
| 2010/0100371 | A1 | 4/2010 | Yuezhong et al. | |
| 2010/0149565 | A1* | 6/2010 | Mori ...................... | B65H 33/00 358/1.9 |
| 2010/0205541 | A1* | 8/2010 | Rapaport ............... | G06Q 30/02 715/753 |
| 2011/0154220 | A1* | 6/2011 | Chunilal ................ | G06F 16/48 715/751 |
| 2011/0271205 | A1* | 11/2011 | Jones .................. | H04L 12/1822 715/753 |
| 2013/0198296 | A1* | 8/2013 | Roy ...................... | G06Q 10/107 709/206 |
| 2013/0222236 | A1 | 8/2013 | Gardenfors et al. | |
| 2014/0025371 | A1 | 1/2014 | Min | |
| 2014/0229888 | A1* | 8/2014 | Ko ....................... | G06F 3/04842 715/783 |
| 2014/0257902 | A1 | 9/2014 | Moore et al. | |
| 2014/0280288 | A1 | 9/2014 | Hwang et al. | |
| 2014/0344675 | A1* | 11/2014 | Chang .................. | G06F 3/0482 715/244 |
| 2015/0222576 | A1 | 8/2015 | Anderson et al. | |
| 2019/0272511 | A1 | 9/2019 | Photowat | |
| 2022/0383864 | A1* | 12/2022 | Gruber .................. | G10L 13/02 |

FOREIGN PATENT DOCUMENTS

| | | |
|---|---|---|
| KR | 1020120005638 A | 1/2012 |
| KR | 1020130034885 A | 4/2013 |
| KR | 10-2013-0058856 A | 6/2013 |
| KR | 1020140011073 A | 1/2014 |

OTHER PUBLICATIONS

Communication issued Oct. 12, 2021 by the Korean Intellectual Property Office in Korean Patent Application No. 10-2014-0146429.
Final Office Action issued in parent U.S. Appl. No. 14/660,444 mailed Dec. 28, 2018.
Final Office Action issued in parent U.S. Appl. No. 14/660,444 mailed Jan. 24, 2018.
Notice of Allowance issued in parent U.S. Appl. No. 14/660,444 mailed Oct. 30, 2019.
Office Action issued in parent U.S. Appl. No. 14/660,444 mailed Jul. 13, 2017.
Office Action issued in parent U.S. Appl. No. 14/660,444 mailed Jun. 15, 2018.
Office Action issued in parent U.S. Appl. No. 14/660,444 mailed Jun. 21, 2019.
Office Action issued in parent U.S. Appl. No. 16/811,412 mailed Feb. 2, 2021.
Final Office Action issued in parent U.S. Appl. No. 16/811,412 mailed Jul. 28, 2021.
Office Action issued in parent U.S. Appl. No. 16/811,412 mailed Dec. 29, 2021.
Final Office Action issued in parent U.S. Appl. No. 16/811,412 mailed Jun. 6, 2022.
Notice of Allowance issued in parent U.S. Appl. No. 16/811,412 mailed Oct. 26, 2022.

* cited by examiner

FIG. 16

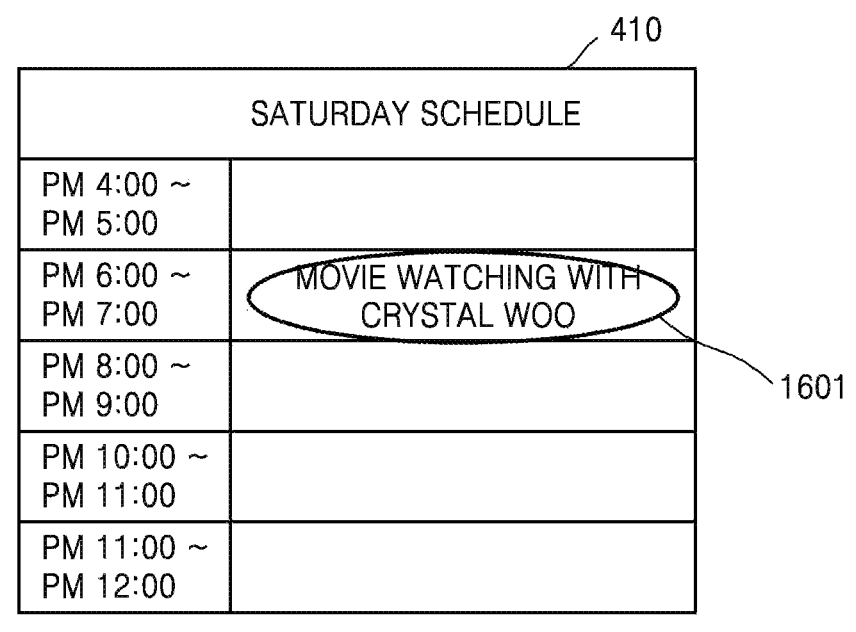

| SATURDAY SCHEDULE | |
|---|---|
| PM 4:00 ~ PM 5:00 | |
| PM 6:00 ~ PM 7:00 | MOVIE WATCHING WITH CRYSTAL WOO |
| PM 8:00 ~ PM 9:00 | |
| PM 10:00 ~ PM 11:00 | |
| PM 11:00 ~ PM 12:00 | |

410

1601

FIG. 23
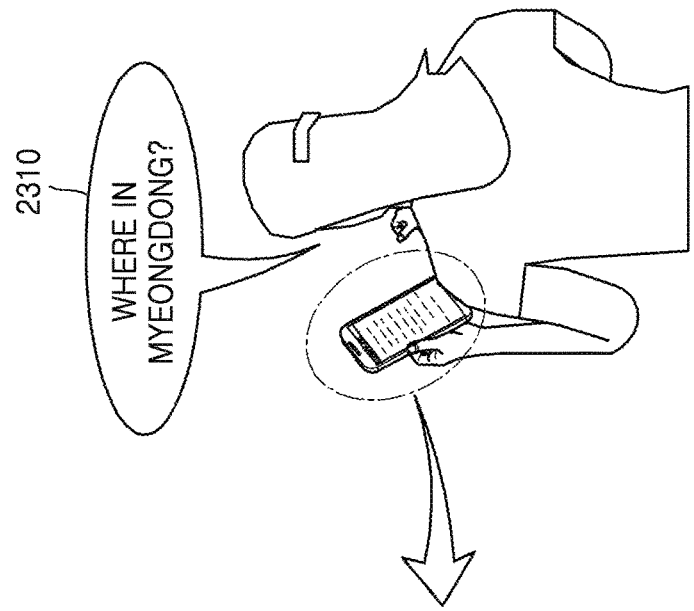
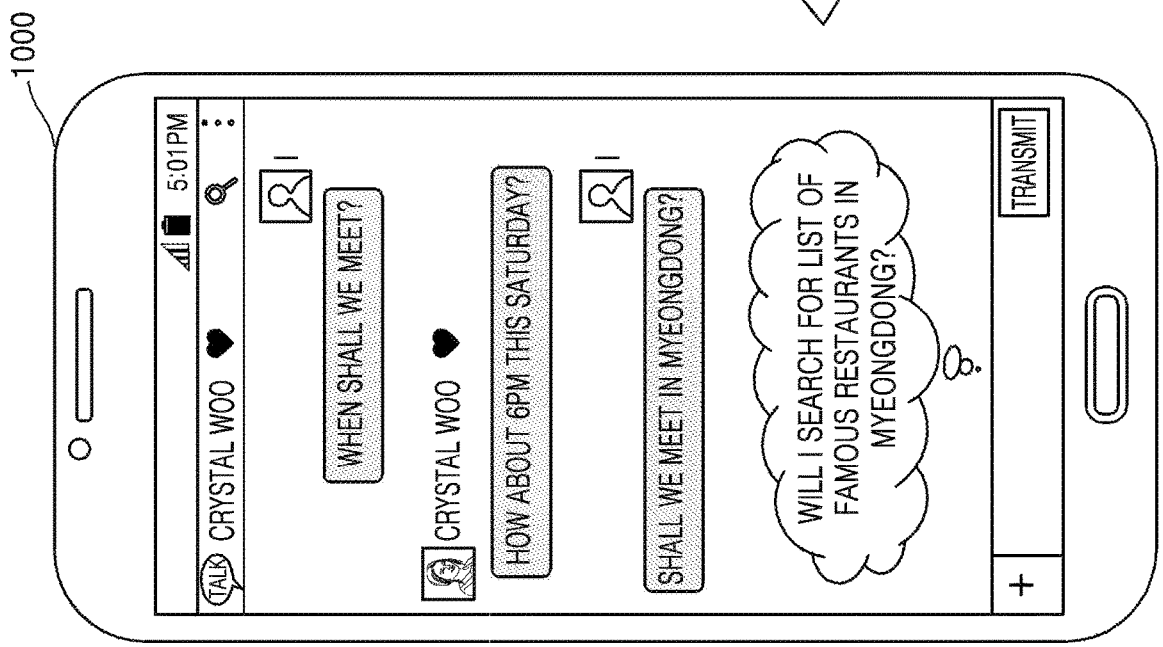

METHOD AND APPARATUS FOR PROVIDING CONTENT

CROSS REFERENCE TO RELATED APPLICATIONS

This is a continuation of U.S. patent application Ser. No. 16/811,412, filed Mar. 6, 2020, which is a continuation of U.S. application Ser. No. 14/660,444, filed on Mar. 17, 2015 (now U.S. Pat. No. 10,587,745), which claims the priority from Korean Patent Application No. 10-2014-0031823, filed on Mar. 18, 2014 and Korean Patent Application No. 10-2014-0146429, filed on Oct. 27, 2014, in the Korean Intellectual Property Office, the disclosures of which are incorporated herein by reference in their entireties.

BACKGROUND

1. Field

Apparatuses and methods consistent with one or more exemplary embodiments relate to providing content, and more particularly, to providing content in a terminal by using a messaging application.

2. Description of the Related Art

With developments in communication technologies, various types of terminals that are capable of data communication have become widely distributed. For example, smart phones, personal digital assistants (PDAs), tablet personal computers (PCs), smart televisions (TVs), cellular phones, laptops, and PCs have come into widespread use. Such terminals may provide various data transmission services and other additional services.

Many of these terminals may provide messaging services. For example, services, such as instant messaging, short message service (SMS), multimedia messaging service (MMS), long message service (LMS), and emails, may be provided.

Also, personal information, such as calendars, schedules, contact information, and memos, may be managed by using the terminals. For example, users may manage their personal information by using a personal information management system (PIMS) provided through the terminals.

Users benefit by using terminals capable of providing these various functions such as messaging services and PIMS.

SUMMARY

One or more exemplary embodiments provide a method of providing content efficiently in a terminal by using a messaging application, the content being provided to manage personal information of a user and to efficiently process a user's businesses.

One or more exemplary embodiments also provide a computer-readable recording medium having stored thereon a computer program for executing a method of providing content.

According to an aspect of an exemplary embodiment, there is provided a method of providing content in a terminal, the method including obtaining a first message that is input through a user interface of the terminal, wherein the user interface is provided by a messaging application that executes a messaging service in the terminal; generating content based on the first message, and a second message stored in the terminal; and providing the generated content via the terminal.

The generating the content may include: obtaining the second message stored in the terminal; obtaining information from the first message and the second message; and generating the content based on the information obtained from the first message and the second message.

The obtaining the second message stored in the terminal may include obtaining the second message from a second terminal that is different than the terminal, via the messaging application.

The generating the content based on the information obtained from the first message and the second message may include generating the content based on at least one of the information obtained from the first message and the second message, and user information of the terminal.

The user information may include at least one of schedule information of a user of the terminal, mail information, and information stored in a cloud.

The content may include at least one of additional information related to schedule information of a user of the terminal, additional information related to location information of the first message and the second message, additional information related to advertisement information of the first message and the second message, additional information related to reservation information pre-stored by the user of the terminal, file information related to information from the first message and the second message, and additional information related to information of a third party invitation through the messaging service.

The first message and the second message may correspond to at least one of text data, sound data, and image data, and the obtaining the information from the first message and the second message comprises obtaining the information from the first message and the second message, according to a criterion corresponding to a type of data of the first message and the second message.

The criterion may include extracting a keyword if the type of data is text data, extracting a sound element if the type of data is sound data, and performing image recognition if the type of data is image data.

The providing the generated content may include displaying the content on a layer different than the layer of the user interface provided by the messaging application.

The providing the generated content may include outputting the content as a sound when the first message is obtained as sound data.

The providing the generated content may include at least one of transmitting a file related to the content from the terminal to a second terminal that is different than the terminal, and receiving, via the terminal, the file related to the content from the second terminal.

The method may further include receiving a third message from a second terminal that is different than the terminal, via the messaging application, based on the information obtained from the first message and the second message.

According to an aspect of another exemplary embodiment, there is provided a terminal for providing content, the terminal including a controller configured to obtain a first message that is input through a user interface provided by a messaging application that executes a messaging service in the terminal, obtain a second message stored in the terminal, and generate content based on the first message and the second message; and an outputter configured to provide the generated content via the terminal.

The controller may be further configured to obtain, via the messaging application, the second message provided by a second terminal that is different than the terminal.

The controller may be further configured to obtain information from the first message and the second message, and generate the content based on the information from the first message and the second message.

The controller may be further configured to generate the content based on at least one of the information from the first message and the second message, and user information of the terminal.

The first message and the second message may correspond to at least one of text data, sound data, and image data, and the controller is configured to obtain the information from the first message and the second message, according to a criterion corresponding to a type of data of the first message and the second message.

The criterion may include extracting a keyword if the type of data is text data, extracting a sound element if the type of data is sound data, and performing image recognition if the type of data is image data.

The outputter may display the content on a layer different than the layer of the user interface provided by the messaging application.

According to an aspect of another exemplary embodiment, there is provided a non-transitory computer-readable recording medium having stored thereon a program for executing a method of providing content through a terminal, the method comprising: obtaining a first message that is input through a user interface of the terminal, wherein the user interface is provided by a messaging application that executes a messaging service in the terminal; generating content based on the first message and a second message stored in the terminal; and providing the generated content via the terminal.

BRIEF DESCRIPTION OF THE DRAWINGS

The above and/or other aspects will become apparent and more readily appreciated from the following description of exemplary embodiments, taken in conjunction with the accompanying drawings in which:

FIGS. 14 through 17 are views illustrating a method of updating user information by using provided content, according to an exemplary embodiment;

FIGS. 22 through 29 are views illustrating a user interface through which content is provided, according to another exemplary embodiment;

DETAILED DESCRIPTION

Figure 1:
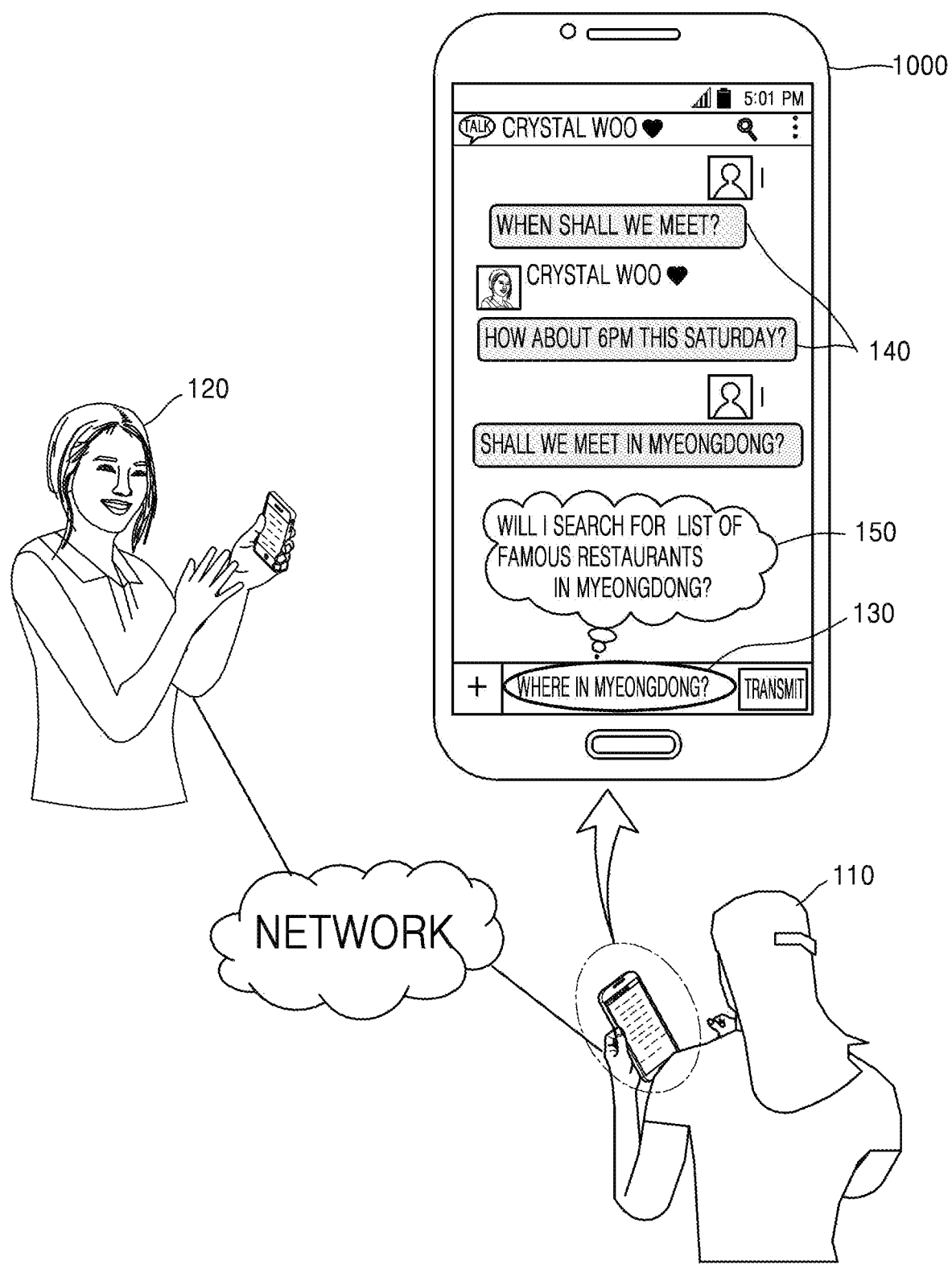
FIG. 1 is conceptual view illustrating an example in which users exchange messages by using a messaging service, according to an exemplary embodiment.

Reference will now be made in detail to one or more exemplary embodiments, examples of which are illustrated in the accompanying drawings. In the drawings, like reference numerals refer to like elements throughout, and a repeated explanation thereof might not be given. As used herein, the term "and/or" includes any and all combinations of one or more of the associated listed items. Expressions such as "at least one of," when preceding a list of elements, modify the entire list of elements and do not modify the individual elements of the list.

Many of the terms used herein are general terms that are widely used in the technical art to which the present disclosure pertains. However, some of the terms used herein may be created reflecting intentions of technicians in this art, precedents, or new technologies.

Also, some of the terms used herein may be chosen for the present disclosure. In this case, these terms are defined in detail below. Accordingly, these specific terms used herein may be understood based on the expressed meanings thereof and within the context of the present disclosure.

Throughout the specification, unless specifically stated otherwise, it will be understood that when an element is referred to as being "connected" to another element, it may be "directly connected" to the other element or it may be "electrically connected" to the other element with intervening elements therebetween. It will be further understood that when a part "includes" or "comprises" an element, unless otherwise defined, the part may further include other elements.

Throughout the specification, "a messaging service" may refer to a service in which messages are transmitted or received by using data communication. For example, messaging service may include an instant messaging service, a short message service (SMS), a multimedia messaging service (MMS), a long message service (LMS), and an electronic mail (email) service.

Throughout the specification, "a message" may refer to content that a user transmits to another user in a terminal by using the messaging service. Also, content that the other user transmits to the user by using the messaging service is also referred to as the message. In addition, the message may be obtained from content that is stored in the terminal. For example, content based on a user's schedule that is stored in the terminal may be included in the message. In detail, when a user's schedule includes "a company get-together at 6 PM this Friday," "a company get-together at 6 PM this Friday" may be included in the message.

Throughout the specification, "content" may refer to various information provided by the internet or computer communication, or to the content of the information. The "content" may refer to characters, signals, voices, sounds, images, and videos that are processed in a digital way to be used in wired or wireless telecommunication networks, or to the content of the characters, signals, voices, sounds, images, and videos that are processed in a digital way to be used in wired or wireless telecommunication networks.

Hereinafter, exemplary embodiments will be described in detail with reference to the accompanying drawings.

FIG. 1 is a conceptual view of an example in which users exchange messages by using a messaging service, according to an exemplary embodiment.

According to an exemplary embodiment, a user may exchange messages with another user through the messaging service. In detail, in a terminal 1000, the user 110 transmits or receives a message with another user 120 by executing a messaging application that is used for the messaging service. The terminal 1000 that the user 110 uses and a terminal that the other user 120 uses are connected by a network. The messaging application is one of a plurality of applications installed in a terminal, and the messaging application may be distributed in application stores or application markets.

According to an exemplary embodiment, the terminal 1000 may obtain a first message 130 that is input by the user 110. The first message 130 is a message that is input in an input window of a user interface that is provided by the messaging application used for the messaging service of the terminal.

According to an exemplary embodiment, the terminal 1000 may obtain a second message 140. The second message may be a message or messages that are stored in the terminal 1000.

Here, first message 130 that is input in the input window of the user interface and second messages 140 that are stored in the terminal 1000 may correspond to at least one of text data, sound data, and image data. However, the first message 130 and the second messages 140 are not limited thereto.

According to an exemplary embodiment, the second message 140 may include information of the user 110 that is input by the user 110. Also, the second message 140 may be a message that is provided by an external server (for example, a cloud).

According to an exemplary embodiment, the terminal 1000 may generate content by analyzing the first message 130 and the second message 140. The terminal 1000 may obtain information by extracting key elements from the first message 130 and the second message 140 and may generate content by using at least one of information of user 110, information stored in the cloud, information included in the first message 130, and information included in the second messages 140.

According to an exemplary embodiment, the content may include at least one selected from schedule information (for example, stored schedules, schedule changes, schedule recommendations, etc.) of the user 110 of the terminal 1000, location information (for example, appointment place recommendations, a list of famous restaurants, travel destinations, etc.) related to information included in the first message 130 and the second messages 140, advertisement information (for example, department store advertisements, product advertisements, hotel advertisements, etc.) related to information included in the first message 130 and the second messages 140, reservation information (for example, pre-storing predicted sentences, etc.) pre-stored by the user 110, file information (transferring music, photos, videos, etc. included in a conversation) related to information included in the first message 130 and the second messages 140, and third party invitation information (inviting a single user or a plurality of users to a conversation) through the messaging service.

According to an exemplary embodiment, types of content may include a video, a still image (for example, a photo, a picture, etc.), a text (for example, a journal article, a letter, a webpage, etc.), and music (for example, music, instrumental music, radio broadcasting, etc.). However, types of content are not limited thereto.

According to an exemplary embodiment, the terminal 1000 may provide the generated content to the user 110. For example, the terminal 1000 may provide the content by displaying the content in a display unit or by outputting the content via a sound output unit of the terminal 1000.

Meanwhile, although it is illustrated in FIG. 1 that the terminal 1000 is a mobile terminal, the terminal 1000 may be realized as various types. For example, the mobile terminal may include cellular phones, smart phones, laptop computers, tablet PCs, electronic book terminals, digital broadcasting terminals, personal digital assistants (PDAs), portable multimedia players (PMPs), navigations, MP3 players, digital cameras, smartwatches, etc. However, the mobile terminal is not limited thereto.

Hereinafter, various operations and applications that are executed by the terminal 1000 will be described. Even if configurations of the terminal 1000 are not specified, the terminal 1000 should be construed to encompass all exemplary embodiments that might occur to one of ordinary skill in the art. Also, the present disclosure is not limited to particular configurations or the specified physical/logical structures.

Figure 2:
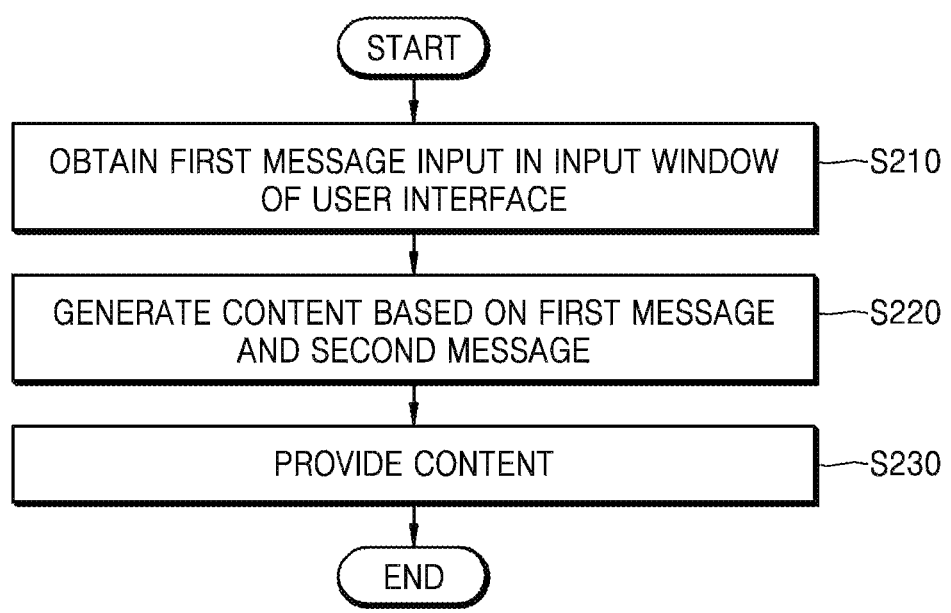
FIG. 2 is a flowchart illustrating a method of providing content, according to an exemplary embodiment.

FIG. 2 is a flowchart of a method of providing content, according to an exemplary embodiment.

Referring to FIG. 2, in operation S210, the terminal 1000 may obtain the first message 130 that is input in an input window of a user interface. The user interface may be provided by a messaging application that is used for a messaging service. The terminal 1000 may receive, in the input window of the user interface, an input of a message that is to be provided to a terminal of another user. Here, the terminal 1000 may receive the first message 130 as a type of at least one of text data, sound data, and image data.

In operation S220, the terminal 1000 may generate the content 150 based on the first message 130, and the second message 140 stored in the terminal 1000. The second message stored in the terminal 1000 may be a message that is stored as any type of data in a storage unit of the terminal 1000.

For example, information of a user's schedule that is stored in a schedule management application of the terminal 1000 may be the second message 140. According to another example, information stored in a conversation window provided by the messaging application that is used for the messaging service may be the second message 140. Also, information which is transmitted from a server (for example, a twitter server) of another messaging service that is different from the currently provided messaging service and is stored in the terminal 1000 may be the second message 140.

According to an exemplary embodiment, the terminal 1000 may obtain the second message 140 stored in the terminal 1000 and may obtain information included in the first message 130 and the second message 140. The information included in the first message 130 and the second message 140 may be obtained by analyzing content of the first message 130 and the second message 140.

According to an exemplary embodiment, the analysis may be performed by extracting key elements included in the first message 130 and the second messages 140. The extraction of the key elements may be performed according to a pre-configured criterion. The pre-configured criterion may vary depending on types of the message data. For example, in the case of the text data, a pre-configured keyword may be extracted; in the case of the sound data, a pre-configured sound element may be extracted; and in the case of the image data, image recognition may be performed, so that information included in the first message 130 and the second messages 140 may be obtained.

For example, when the first message 130 and the second message 140 include such words as "shall we meet?", "this Saturday," "6 PM," and "Myeong-dong," the terminal 1000 may analyze that the first message 130 and the second message 140 include information to generate "a schedule in Myeong-dong at 6 PM this Saturday" between the users exchanging messages.

According to an exemplary embodiment, the terminal 1000 may generate the content 150 based on the information included in the first message 130 and the second message 140. The terminal 1000 may generate the content 150 based on user information of the terminal 1000 and information included in the first message 130 and the second messages 140. Here, the user information may refer to at least one of a user's schedule information, mail information, and information stored in a cloud. Also, the user information may be information that is stored in a storage medium of the terminal 1000, a cloud, or a PIMS server. Here, a cloud may refer to a server of a service provider. In detail, when a cloud is used, software and data are stored in a central computer connected to an internet, and when the internet is accessed, the software or data stored in the central computer may be used whenever and wherever.

According to an exemplary embodiment, the content 150 may include at least one selected from schedule information of the user the terminal 1000, location information related to the information included in the first message 130 and the second messages 140, advertisement information related to the information included in the first message 130 and the second messages 140, reservation information pre-stored by the user of the terminal 1000, file information related to the information included in the first message 130 and the second messages 140, and information of a third party invitation through the messaging service.

For example, when the first message 130 and the second messages 140 include the information corresponding to "Myeong-dong at 6 PM this Saturday," the terminal 1000 may compare the schedule information of the user and the information of "Myeong-dong at 6 PM this Saturday." Based on a result of the comparison, the terminal 1000 may determine whether time information of the information included in the first message 130 and the second message 140 conflict with time information of the schedule information of the user. When it is determined that the pieces of time information conflict with each other, the terminal 1000 may generate content informing that the time information of the information included in the first message 130 and the second message 140 conflict with the time information of the schedule information of the user. When it is determined that the pieces of time information do not conflict with each other, the terminal 1000 may generate the content 150 including a list of famous restaurants in "Myeong-dong."

According to an exemplary embodiment, the content 150 may be generated from the user information of the terminal 1000 or based on user information of a first terminal that is different from the terminal 1000. A user of the first terminal may refer to a user that transmits or receives the second message 140. For example, when a group conversation is performed in an instant messaging service, a user of the first terminal may be a user out of a plurality of users in a group. Also, the user information of the first terminal may denote summary information about the conversation participants. For example, the user information of the first terminal may include at least one selected from conversation participants' addresses, hobbies, preferences, and relationships with the user of the terminal 1000. However, the user information of the first terminal is not limited thereto.

According to an exemplary embodiment, when the user information of the first terminal includes information about the addresses, the terminal 1000 may generate the content 150 recommending a place located in similar distances from the addresses. Also, when the user information of the first terminal includes information about hobbies or preferences, the terminal 1000 may generate the content 150 recommending a product or a place that is preferred by at least one of the conversation participants. Alternatively, when the user information of the first terminal includes information about the relationships with the user of the terminal 1000, the terminal 1000 may generate the content 150 including information that is different according to the relationships. For example, the content 150 generated by the terminal 1000 may include sentences, each having a different tone of voice, according to whether the relationship of the user of the first terminal with the user of the terminal 1000 is a friend or a business partner. However, the user information of the first terminal may vary according to one or more exemplary embodiments, and is not limited to what are described above.

According to an exemplary embodiment, the first message 130 and the second message 140 may be at least one selected from text data, sound data, and image data. The terminal 1000 may obtain information included in the first message 130 and the second message 140, according to a criterion that is pre-configured in correspondence to the first message 130 and the second message 140. Here, the pre-configured criterion may include extracting a pre-configured keyword in text data, extracting a pre-configured sound element in sound data, and performing image recognition in image data so that the information included in the first message 130 and the second message 140 are obtained.

According to an exemplary embodiment, the first message 130 or the second message 140 may include sound data. When the first message 130 or the second message 140 includes sound data, the terminal 1000 may extract a pre-configured sound element from the sound data. The terminal 1000 may obtain the information included in the first message 130 and the second message 140 based on the extracted sound element, and may generate the content 150 based on the information included in the first message 130 and the second message 140.

According to an exemplary embodiment, the terminal 1000 may obtain a text from the sound data. For example, the terminal 1000 may obtain the text by applying the speech to text (STT) on the sound data. The terminal 1000 may generate the content 150 based on the obtained text. The information included in the first message 130 and the second message 140 may include the text obtained from the sound data.

According to an exemplary embodiment, the first message 130 or the second message 140 may include image data. The terminal 1000 may perform image recognition with respect to the image data. The image recognition refers to the recognition of letters or shapes included in the image data. The terminal 1000 may generate the content 150 based on a result of the image recognition. The information included in the first message 130 or the second message 140 may include information obtained by the image recognition.

The terminal 1000 may provide the generated content 150 in operation S230. The terminal 1000 may provide the content 150 by using various methods according to one or more exemplary embodiments. For example, the terminal 1000 may display the content 150 by using a display device, such as a liquid crystal display (LCD). In this case, the content 150 may include at least one selected from text, a still image, and a video. However, the content 150 is not limited thereto. According to another example, the terminal 1000 may provide the content 150 by using a sound or vibration.

Figure 3:
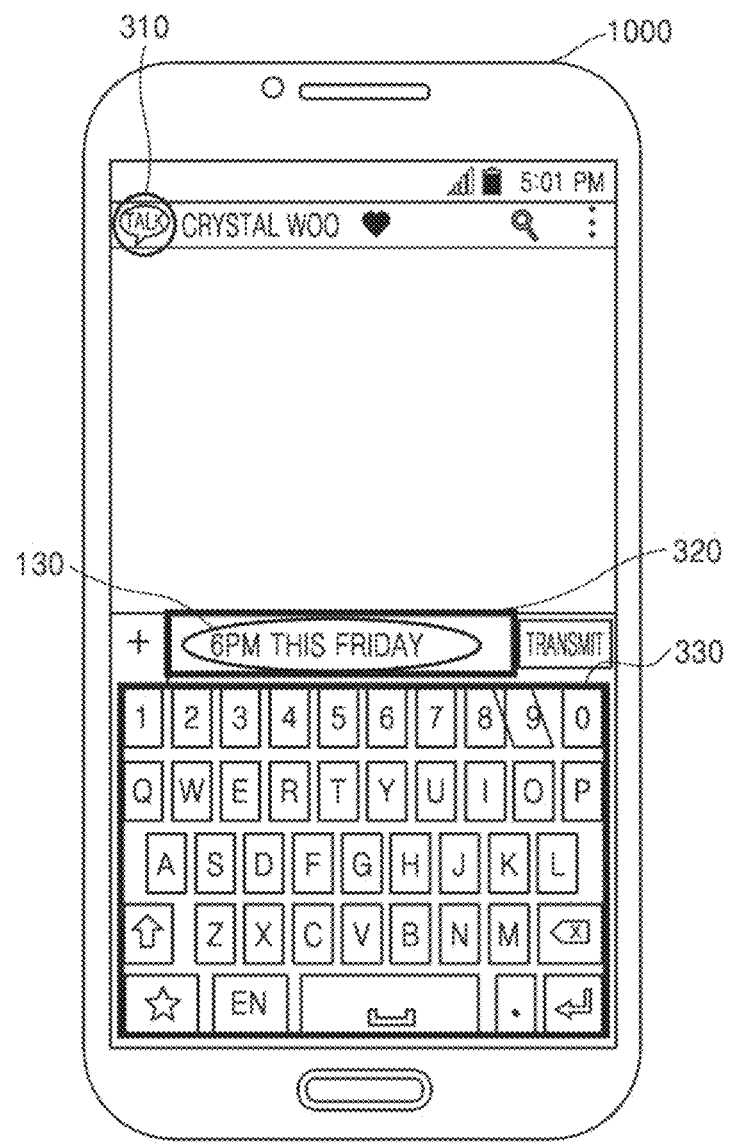
FIG. 3 is a view illustrating a user interface through which messages are displayed, according to an exemplary embodiment.

FIG. 3 is a view illustrating a user interface through which a message is displayed, according to an exemplary embodiment.

According to an exemplary embodiment, a user may input the first message 130 in an input window 320 via the user interface. As illustrated in FIG. 3, the user may execute a messaging application 310 to start a conversation with another user. The user may input the first message 130 in the input window 320 of the user interface by using a text writer or keyboard input 330, in order to transmit the message to the other user. For example, the user may input the first message 130 of "6 PM this Friday" in the input window 320, in order to make an appointment with "Crystal Woo" "at 6 PM this Friday." The terminal 1000 may obtain the first message 130 that is input by the user.

Figure 4:
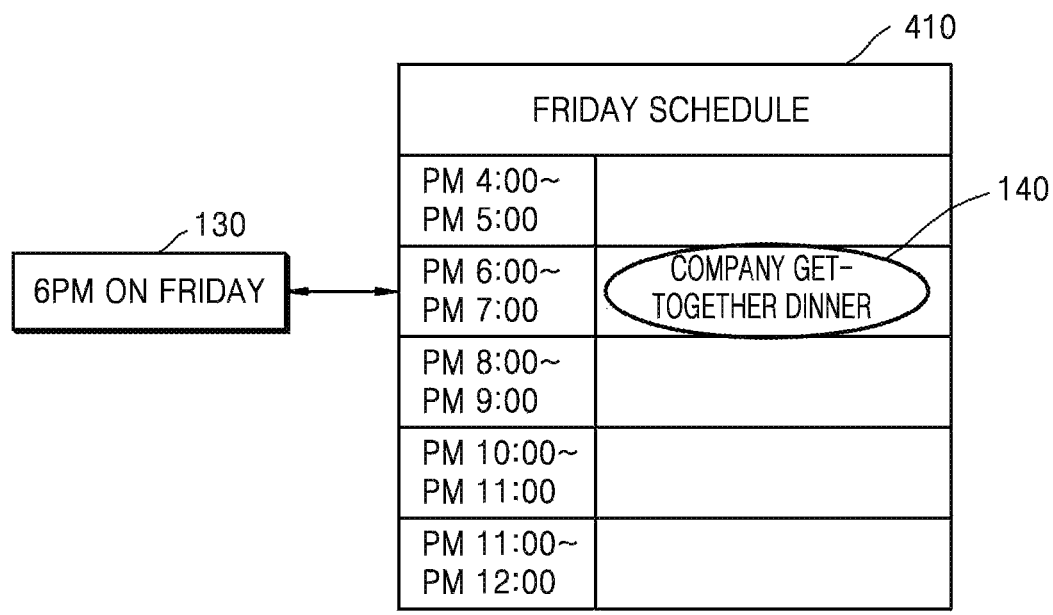
FIG. 4 is a view illustrating a method of comparing a message and user information, according to an exemplary embodiment.

FIG. 4 is a view illustrating a method of comparing a message and user information, according to an exemplary embodiment.

According to an exemplary embodiment, the terminal 1000 may analyze the obtained first message 130 and the second message 140 that is stored in the terminal 1000. Here, the second message 140 stored in the terminal 1000 may be obtained from a user's schedule information 410 as illustrated in FIG. 4. The terminal 1000 may obtain the information of "6 PM this Friday" from the first message 130. The terminal 1000 may obtain the second message 140 including a company get-together schedule at 6 PM this Friday from the user's schedule information 410. The terminal 1000 may compare the first message 130 and the second message 140 and, as a result of the comparison, may determine that the schedules conflict with each other.

Figure 5:
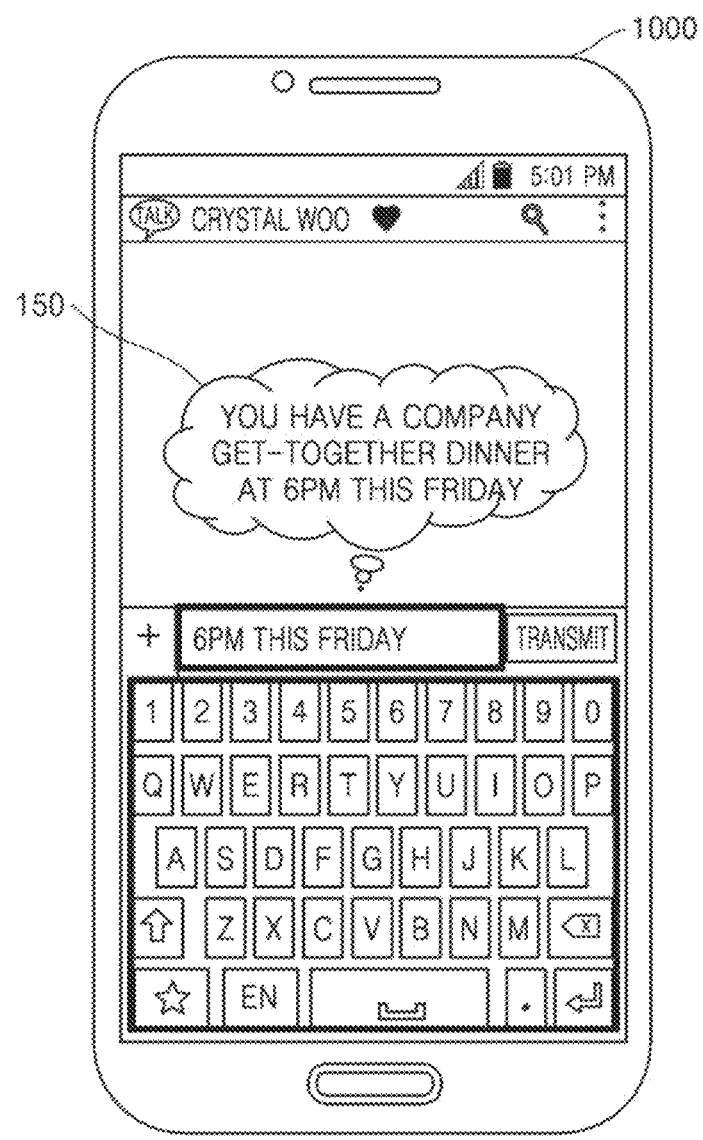
FIG. 5 is a view illustrating a user interface through which content is provided, according to an exemplary embodiment.

FIG. 5 is a view illustrating a user interface through which the content 150 is provided, according to an exemplary embodiment.

According to an exemplary embodiment, the terminal 1000 may generate the content 150 based on a result of analyzing the first message 130 and the second message 140. As illustrated in FIG. 5, the terminal 1000 may generate the content 150 that "you have a company get-together dinner at 6 PM this Friday." The terminal 1000 may provide the generated content 150. The terminal 1000 may display the generated content 150 on a screen of the terminal 1000. Here, the content 150 may be displayed on a different layer, or application, than the user interface provided by a messaging application. If the content 150 is displayed on the different layer, only the user of the terminal 1000 may identify the content 150, and the other user may not identify the content 150.

According to an exemplary embodiment, as illustrated in FIG. 5, the terminal 1000 may display the content 150 that "you have a company get-together dinner at 6 PM this Friday" on the screen of the terminal 1000 or may provide the content 150 in a sound. Also, the terminal 1000 may display the content 150 on the screen of the terminal 1000 and may output vibration or an alarm sound at the same time.

Figure 6:
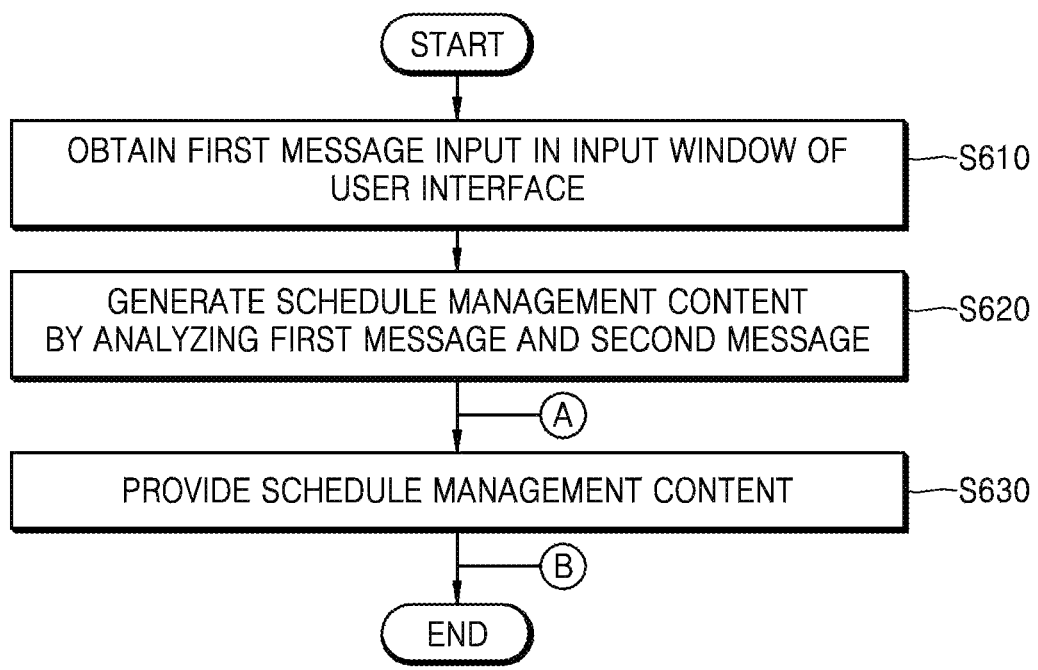
FIG. 6 is a flowchart illustrating a method of providing content, according to an exemplary embodiment.
Figure 7:
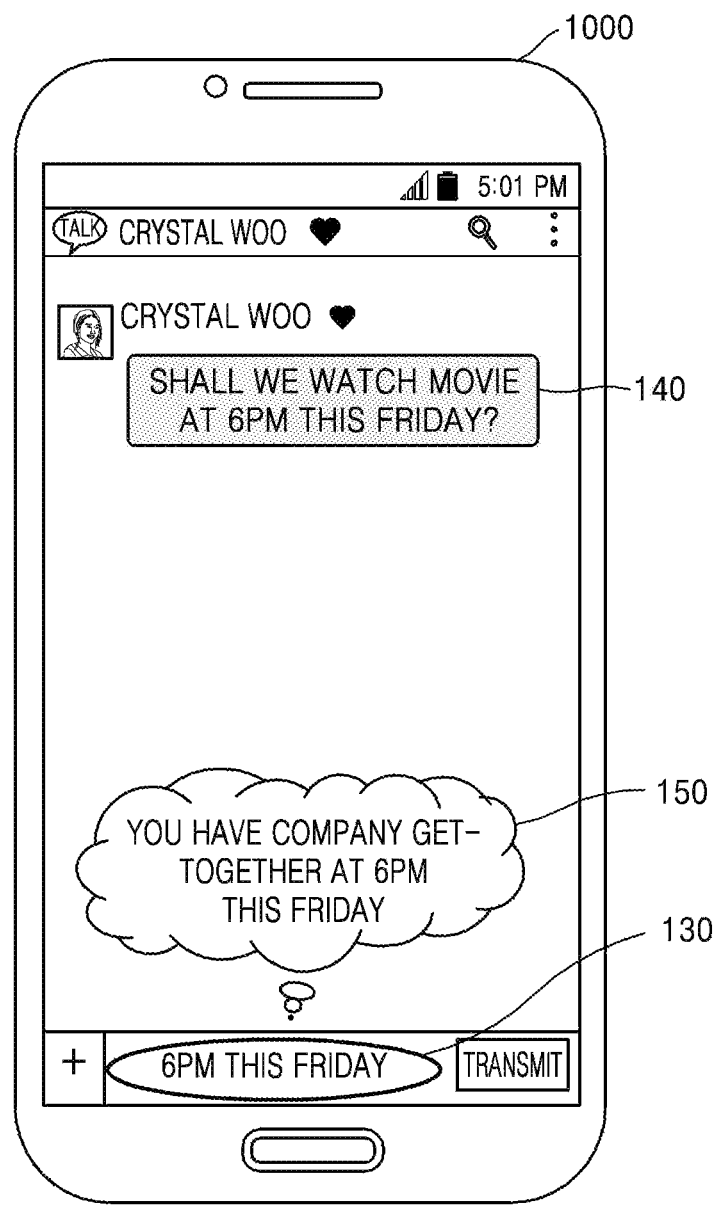
FIGS. 7 and 8 are views illustrating a user interface through which content is provided, according to another exemplary embodiment.
Figure 8:
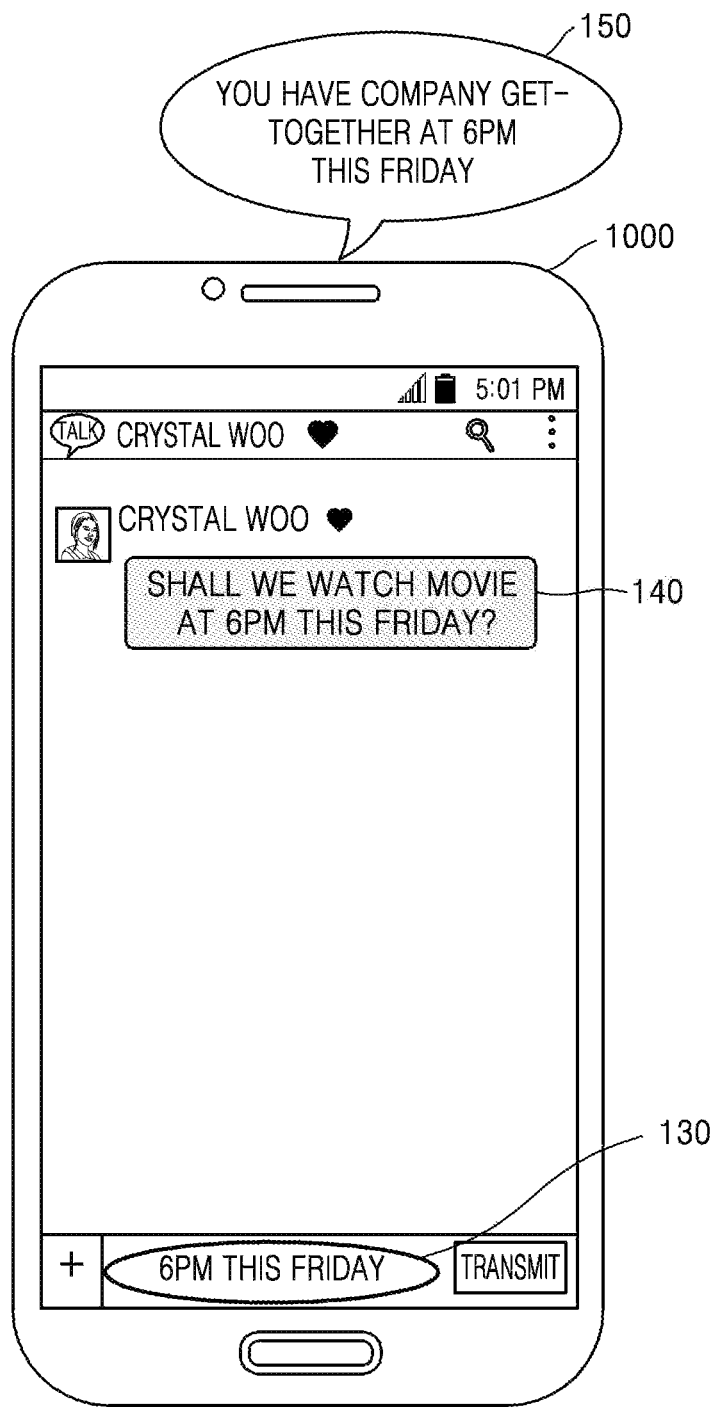

FIG. 6 is a flowchart of a method of providing the content 150, according to an exemplary embodiment. FIGS. 7 and 8 are views illustrating a user interface through which the content 150 is provided, according to another exemplary embodiment.

As illustrated in FIG. 6, the terminal 1000 may obtain the first message 130 that is input in an input window of a user interface in operation S610. The first message 130 may be obtained while a user inputs the message in the input window.

In operation S620, the terminal 1000 may generate the schedule management content 150 by analyzing the first message 130 and the second message 140. The second message 140 is a message stored in the terminal 1000. For example, the message stored in the terminal 1000 may be registration information that is stored in a user's schedules, or conversation information that is stored while a user exchanges messages with another user through a messaging application. Here, the schedule management content 150 may be the content 150 related to at least one selected from a user's schedule, a user's schedule change, a user's schedule recommendation, and another user's schedule. It is understood that the schedule management content 150 includes the content 150 for managing a user's schedules.

According to an exemplary embodiment, the second message 140 may be a message displayed in the user interface provided by the messaging application. In addition to the information provided by the messaging application, the second message 140 may also be obtained from information stored in an internal storage device of the terminal 1000 (for example, user's schedule information stored in the terminal, etc.). Also, the second message 140 may be obtained from a message received from an external storage device of the terminal 1000 (for example, a twitter server, a cloud server, etc.)

As illustrated in FIG. 7, the terminal 1000 may obtain the message stored in a conversation window that "shall we watch movie at 6 PM this Friday?" as the second message 140. The user may input a message through the user interface. The terminal 1000 may obtain the message "6 PM this Friday" that is input by the user as the first message 130. The terminal 1000 may analyze the first message 130 and the second message 140 to obtain information included in the first message 130 and the second message 140. The terminal 1000 may extract "this Friday," "6 PM," and "a movie" as key elements from the first message 130 and the second message 140. The terminal 1000 may obtain the information included in the first message 130 and the second message 140, by using the extracted key elements. That is, the terminal 1000 may compare information stored in a user's schedules and the information included in the first message 130 and the second message 140 and determine whether it is possible to watch a movie at 6 PM this Friday. The terminal 1000 may generate the schedule management content 150 based on a result of the comparison. If the user's schedule information 410 includes a scheduled event of "a company get-together dinner from 6 PM to 7 PM this Friday," the terminal 1000 may generate the content 150 informing of the conflicted schedules.

In operation S630, the terminal 1000 may provide the generated schedule management content 150 to the user. The terminal 1000 may display the schedule management content 150 on a screen of the terminal 1000 or provide the schedule management content 150 in a sound.

As illustrated in FIG. 7, the terminal 1000 may display the content 150 that "there is a company get-together dinner at 6 PM this Friday" on the screen of the terminal 1000. The content 150 might not be displayed on a layer, or application, of the user interface provided by the messaging application and may be displayed on a layer that is different from the layer of the user interface layer. In this case, the content 150 is not shown to the other user and is shown only to the user of the terminal 1000. Also, the terminal 1000 may provide a vibration or an alarm sound when the content 150 is provided to the screen of the terminal 1000.

As illustrated in FIG. 8, the terminal 1000 may provide the content 150 that "you have a company get-together dinner at 6 PM this Friday" in a sound.

Figure 9:
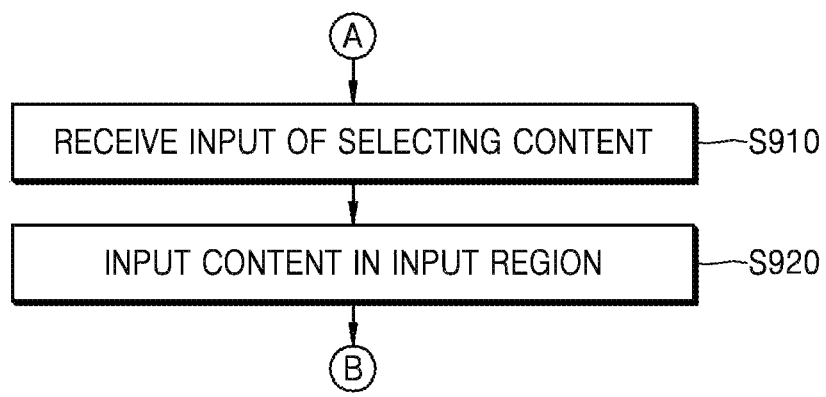
FIG. 9 is a flowchart illustrating a method of inputting a message by using provided content, according to an exemplary embodiment.
Figure 10:
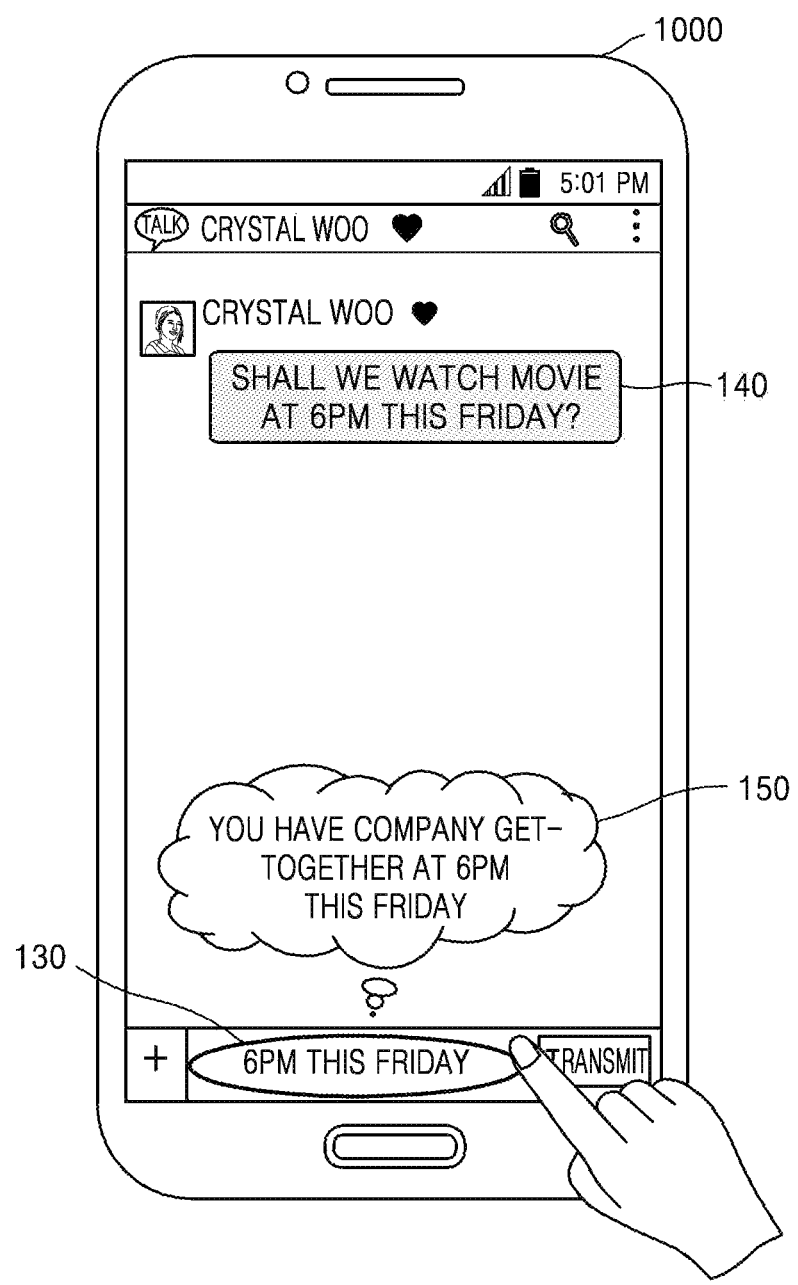
FIGS. 10 through 12 are views illustrating a user interface through which a message is input by using provided content, according to an exemplary embodiment.
Figure 11:
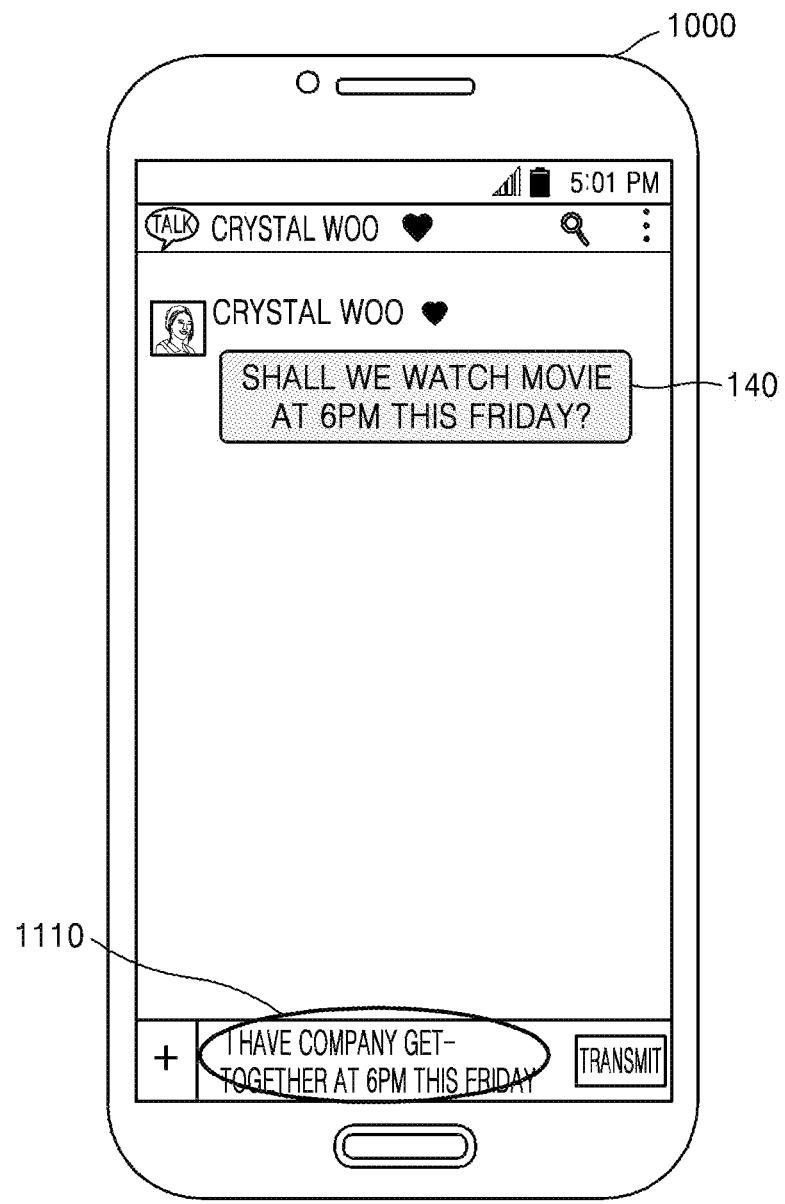
Figure 12:
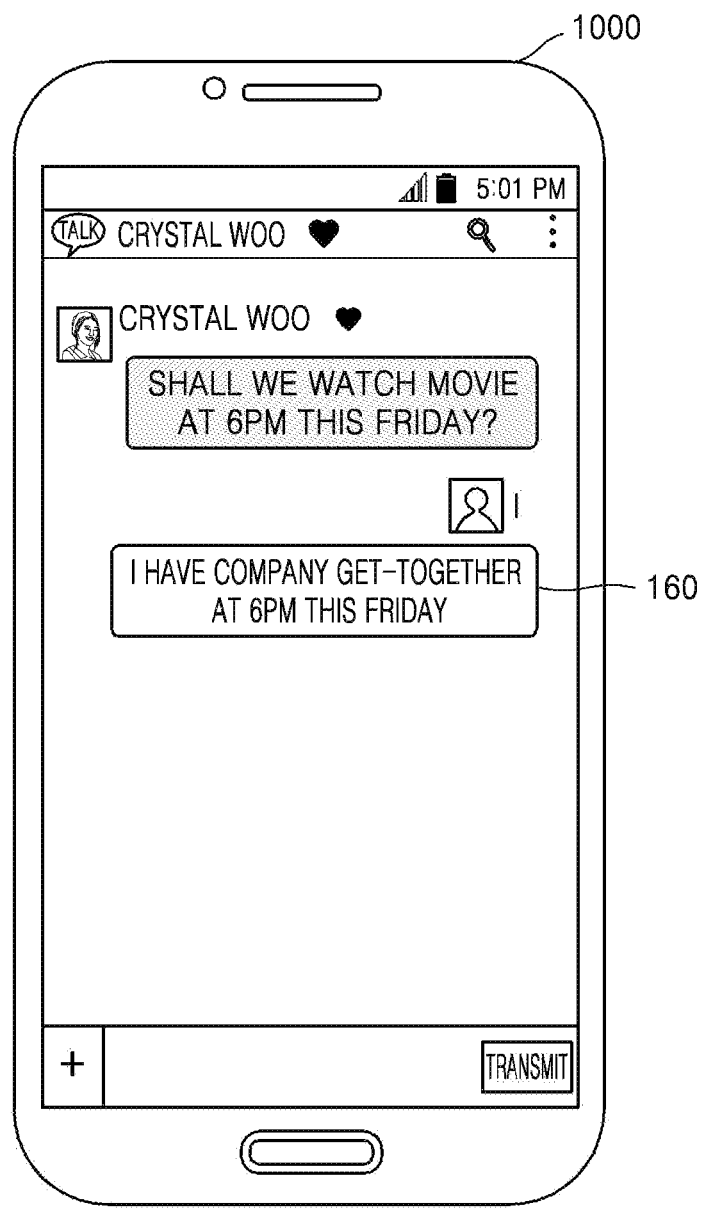

FIG. 9 is a flowchart illustrating in detail a method of providing the schedule management content 150 of FIG. 6. FIG. 9 is a flowchart of a method of inputting a message by using the provided content 150. FIGS. 10 through 12 are views illustrating a user interface through which a message is input by using the provided content 150.

As illustrated in FIG. 9, the terminal 1000 may receive an input 1010 of selecting the content 150 in operation S910. As illustrated in FIG. 10, the content 150 may be displayed on at least one region of a display unit included in the terminal 1000. The terminal 1000 may receive the input 1010 of selecting the content 150. The terminal 1000 includes a touch screen, and when the content 150 is displayed on a region of the touch screen, the terminal 1000 may receive the input 1010 of selecting the region on which the content 150 is displayed, via the touch screen.

In operation S920, the terminal 1000 may input the content 150 in an input region 1110, in response to the input 1010 that is received in operation S910. As illustrated in FIG. 11, the terminal 1000 may convert a message displayed in the input region 1110 as a text included in the content 150. Since the content 150 is input in the input region 1110, the content 150 may be easily written and transmitted.

According to an exemplary embodiment, the terminal 1000 might not input the content 150 in the input region 1110. Instead, the terminal 1000 may provide the content 150 to the user interface provided by a messaging application, in response to the input 1010 that is received in operation S910, as illustrated in FIG. 12.

Figure 13:
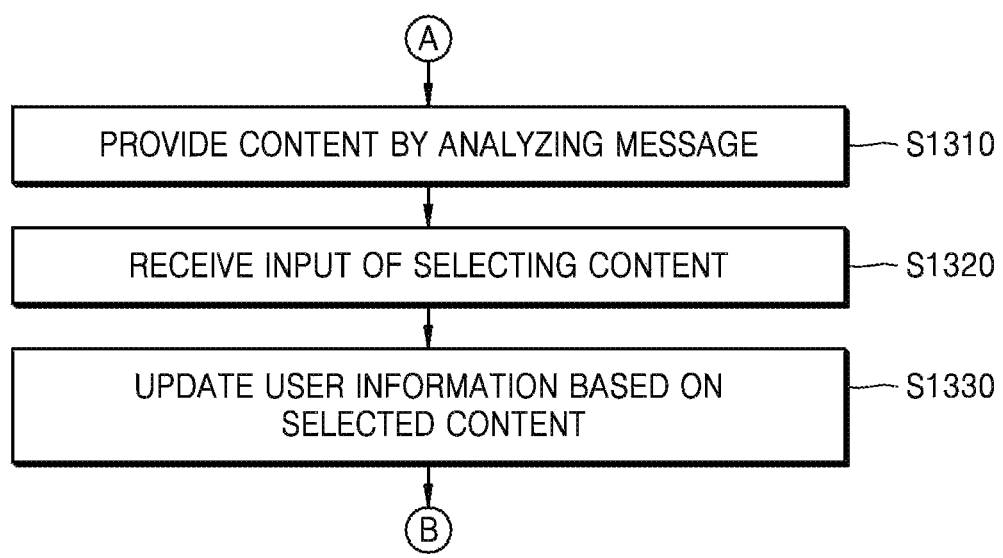
FIG. 13 is a flowchart illustrating a method of updating user information by using provided content, according to an exemplary embodiment.

FIG. 13 is a flowchart of a method of updating user information by using provided content, according to an exemplary embodiment. FIGS. 14 through 17 are views for describing the method of updating user information by using provided content.

As illustrated in FIG. 13, the terminal 1000 may analyze the message 140 and provide content, in operation S1310. Here, the analysis may be performed by extracting key elements included in the message. The extraction of key elements may be performed according to a pre-configured criterion.

Figure 14:
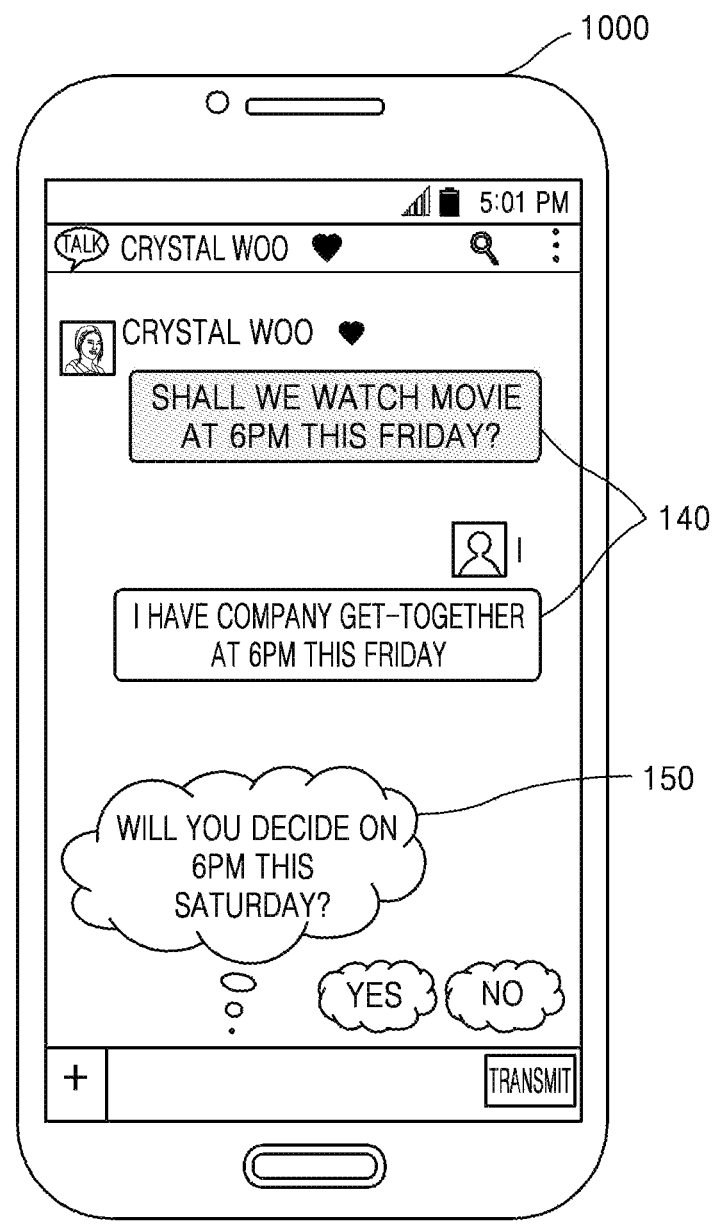

As illustrated in FIG. 14, the terminal 1000 may provide the content 150 with reference to user information. Here, the user information may include at least one selected from user's schedule information, mail information, and social network service information. When the message 140 includes a keyword corresponding to "6 PM this Friday," and the user information includes a schedule conflicting with 6 PM this Friday, the terminal 1000 may provide the content 150 asking whether to decide on "6 PM this Saturday." The terminal 1000 may provide the content 150 indicating "yes" and "no."

Figure 15:
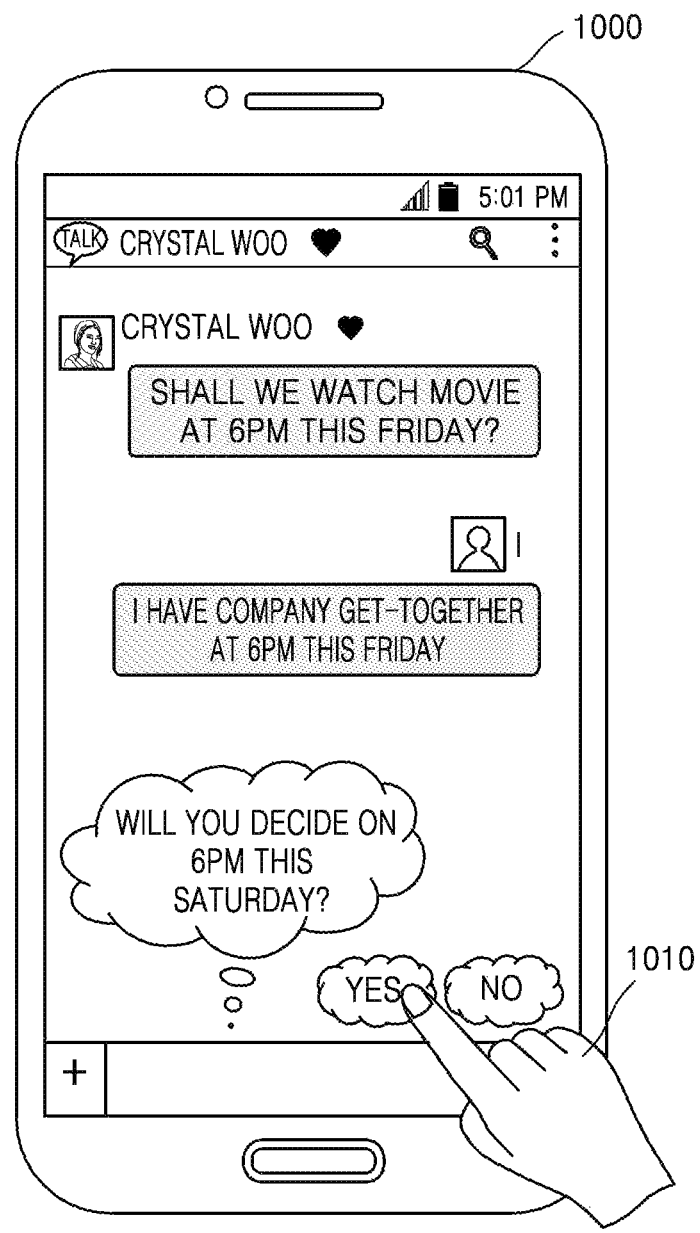

In operation S1320, the terminal 1000 may receive an input of selecting the content 150. As illustrated in FIG. 15, the terminal 1000 may receive the input 1010 of selecting "yes" or "no" with respect to a schedule at "6 PM this Saturday." In this case, if the terminal 1000 has a touch screen, and the content 150 is displayed on a region of the touch screen, the terminal 1000 may receive the input 1010 of selecting the region on which the content 150 is displayed, via the touch screen. Also, when the terminal 1000 does not receive an input of selecting the content 150 indicating "yes" or "no" for a predetermined period of time, the content 150 asking whether to decide on "6 PM this Saturday" and the content 150 indicating "yes" or "no" may be deleted from the terminal 1000.

In operation S1330, the terminal 1000 may update the user information based on the selected content 150. Updating refers to reflecting in the user information added, deleted, and changed content of the user information. As illustrated in FIG. 16, the terminal 1000 may add a schedule of "watching a movie with Crystal Woo at 6 PM this Saturday" 1601 in the user's schedule information 410.

Figure 17:
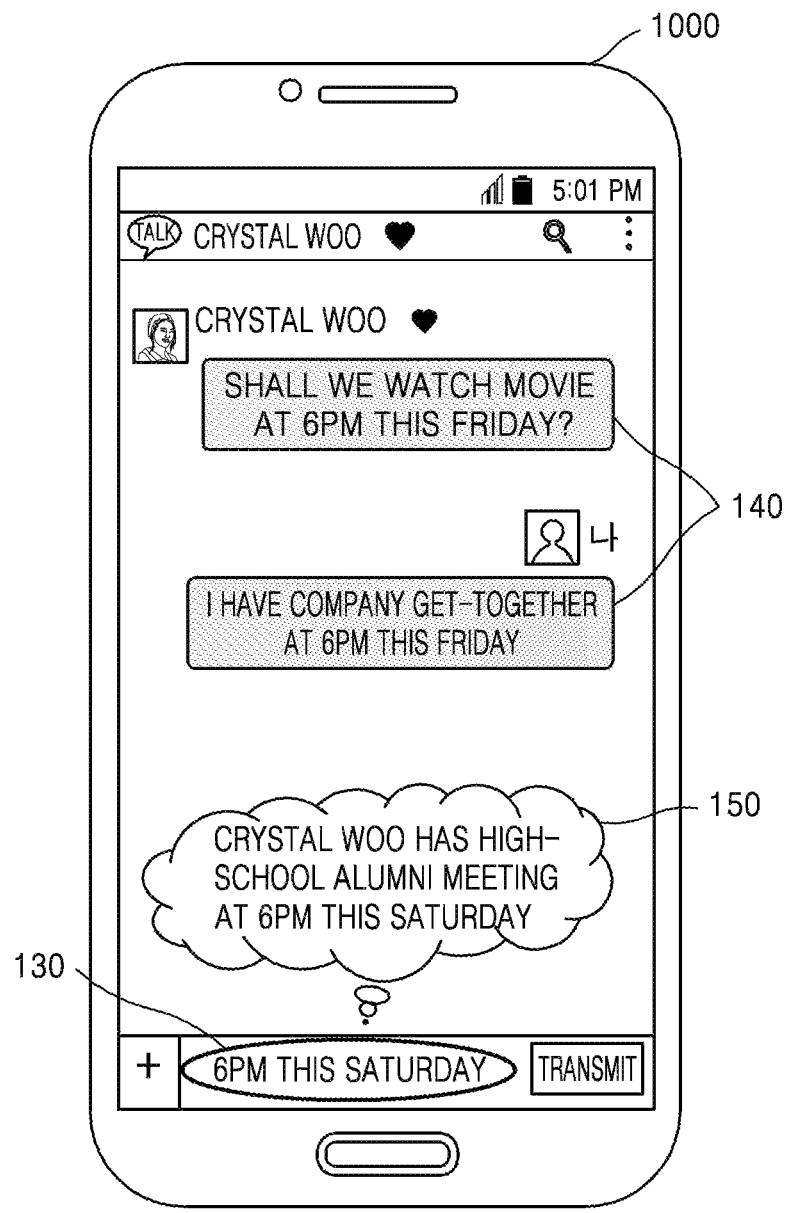

According to an exemplary embodiment, the terminal 1000 may provide content by referring to user information of the other user's terminal. As illustrated in FIG. 17, the terminal 1000 may obtain the first message 130 of "6 PM this Saturday." Also, the terminal 1000 may obtain the second message 140 that "there is a company get-together dinner at 6 PM this Friday." The terminal 1000 may extract key elements of the first message 130 and the second message 140, and may generate the content 150 by using the extracted key elements and the user information of the other user's terminal. The terminal 1000 may extract "6 PM this Saturday" as the key element of the first message 130 and "6 PM this Friday" as the key element of the second message 140. The terminal 1000 may refer to the user information of the other user's terminal, and if there is a schedule conflict, the terminal 1000 may provide the content 150 informing of the schedule conflict. That is, with reference to the first message 130, the second message 140, and the schedule of Crystal Woo, the terminal 1000 may provide the content 150 that "Crystal Woo has a high-school alumni meeting at 6 PM this Saturday."

Figure 18:
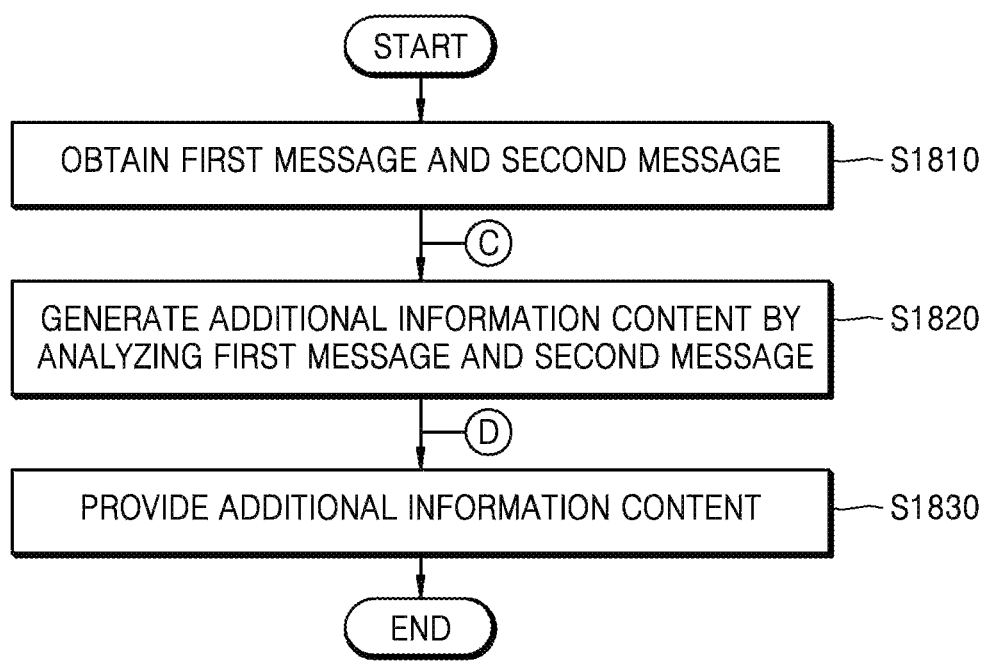
FIG. 18 is a flowchart illustrating a method of providing content, according to another exemplary embodiment.

FIG. 18 is a flowchart of a method of providing content, according to another exemplary embodiment.

As illustrated in FIG. 18, the terminal 1000 may obtain the first message 130 that is input in an input window of a user interface provided by a messaging application and the second message 140 that is stored in the terminal 1000, in operation S1810.

In operation S1820, the terminal 1000 may analyze the first message 130 and the second message 140 and generate additional information content 150. For example, the additional information content 150 may be the content 150 that displays in advance a predicted sentence in an input window provided by a messaging application, recommends an appointment place or music included in a conversation, provides dictionary functions, translation functions, advertisements, or includes information associated with blogs. In addition to the above examples, the additional information content 150 includes the content 150 which may be additionally provided to the user by analyzing conversation content. Also, the additional information content 150 may include at least one selected from additional information related to user's schedule information of the terminal, additional information related to location information included in the first message 130 and the second message 140, additional information related to advertisement information included in the first message 130 and the second message 140, additional information related to reservation information stored in advance by the user of the terminal, file information related to information included in the first message 130 and the second message 140, and additional information related to information with respect to a third party invitation through the messaging service.

In operation S1830, the terminal 1000 may provide the generated additional information content 150 to the user.

Figure 19:
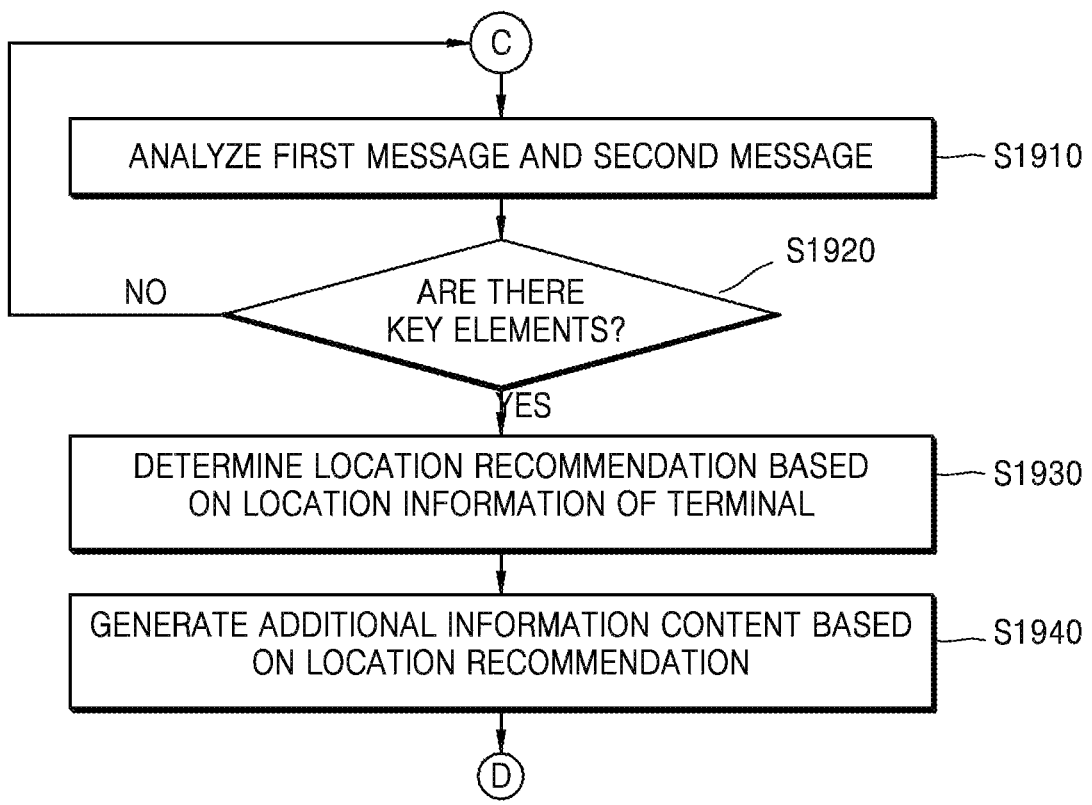
FIG. 19 is a flowchart illustrating a method of providing content, according to another exemplary embodiment.
Figure 20:
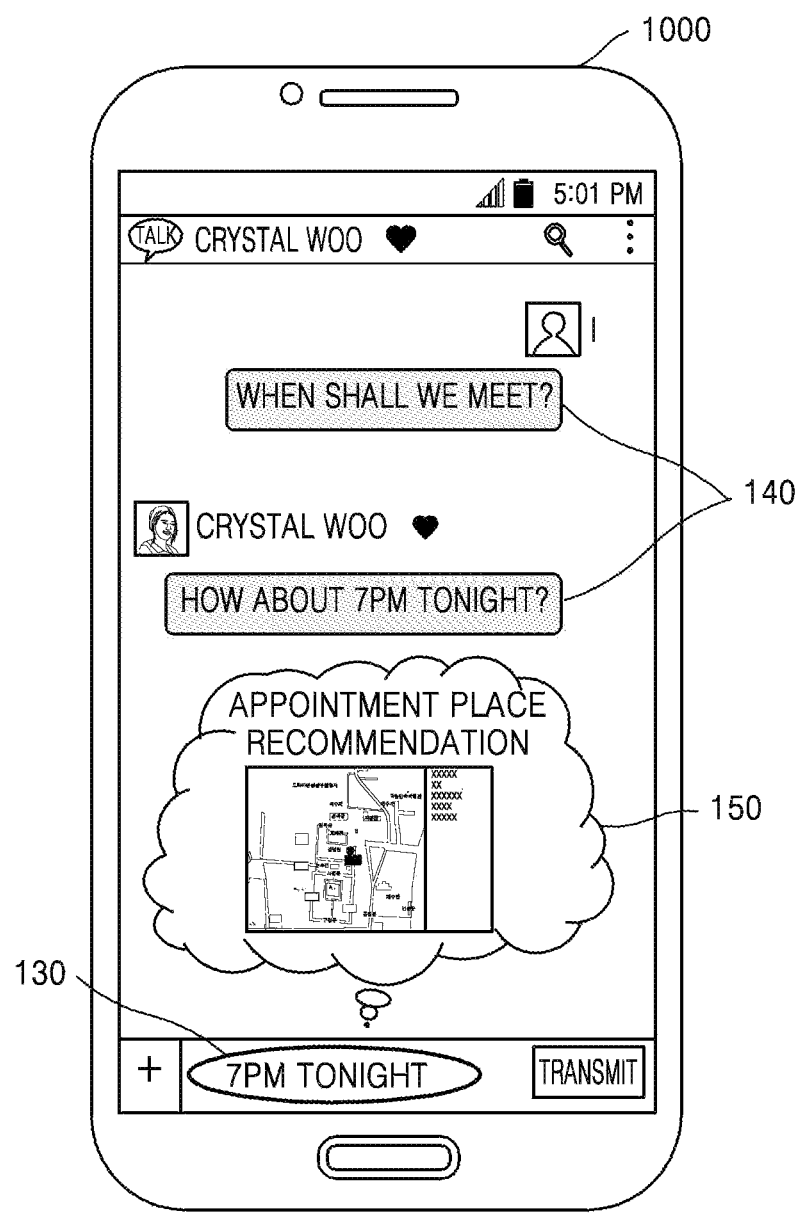
FIG. 20 is a view illustrating a user interface through which content is provided, according to another exemplary embodiment.

FIG. 19 is a flowchart illustrating in detail a method of providing the content 150, according to another exemplary embodiment. FIG. 20 is a view for describing a user interface through which the content 150 is provided, according to another exemplary embodiment.

As illustrated in FIG. 19, in operation S1910, the terminal 1000 may analyze the first message 130 and the second message 140. The first message 130 is a message that is input in an input window of a user interface provided by a messaging application. The second message 140 is a message that is stored in the terminal 1000. Referring to FIG. 20, the first message 130 is "7 PM tonight" and the second messages 140 are "When shall we meet?" and "How about 7 PM tonight?" Also, the terminal 1000 may analyze that there is an intention to meet at 7 PM tonight, through the first message 130 and the second message 140.

In operation S1920, the terminal 1000 may determine whether there are key elements based on a result of analyzing the first message 130 and the second message 140. Referring to FIG. 20, the terminal 1000 may extract the key elements of "7 PM tonight" and "meet" from the first message 130 and the second message 140.

In operation S1930, the terminal 1000 may determine a location recommendation based on location information of the terminal 1000 and location information of a terminal of the other user, based on GPS or other location technology. For example, the terminal 1000 may determine a middle position between the location of the terminal 1000 and the location of the terminal of the other user as the location recommendation. The location information of the terminal of the other user may be received from an external device or obtained from a memory included in the terminal 1000. In detail, when it is identified that the location information of the terminal 1000 is "Gangnam" and the location information of the terminal of the other user is "Ilsan," the terminal 1000 may determine "Yeouido" as the location recommendation.

In operation S1940, the terminal 1000 may generate the additional information content 150 based on the location recommendation. The content 150 may include at least one selected from text, a still image, a video, and map information. Referring to FIG. 20, the terminal 1000 may determine "the IFC mall" located in Yeouido as an appointment place by using user information or a search engine and may generate the content 150 including a map and guide information with respect to the appointment place. Then, the terminal 1000 may provide the generated content 150. As illustrated in FIG. 20, the terminal 1000 may display the content 150 on a different layer than the user interface provided by the messaging application.

Figure 21:
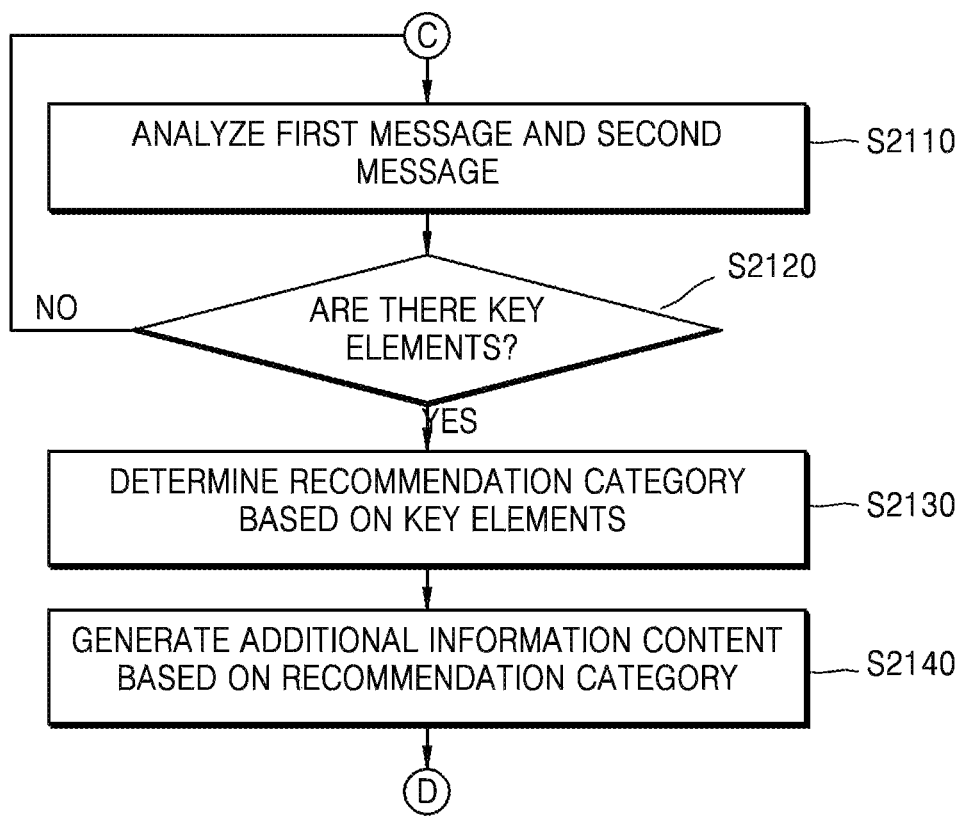
FIG. 21 is a flowchart illustrating a method of providing content, according to another exemplary embodiment.

FIG. 21 is a flowchart of a method of providing the content 150, according to another exemplary embodiment.

As illustrated in FIG. 21, the terminal 1000 may analyze the first message 130 and the second message 140 in operation S2110. The first message 130 is a message input in an input window of a user interface provided by a messaging application. The second message 140 is a message stored in the terminal 1000.

In operation S2120, the terminal 1000 may determine whether there are key elements based on a result of analyzing the first message 130 and the second message 140.

In operation S2130, the terminal 1000 may determine a recommendation category based on the key elements. For example, the recommendation category may be in terms of a place, time, and additional information.

In operation S2140, the terminal 1000 may generate the additional information content 150 based on the recommendation category. For example, when the recommendation category is a place, the terminal 1000 may generate the content 150 related to an appointment place. When the recommendation category is an advertisement, the terminal 1000 may generate the content 150 related to an advertisement. The terminal 1000 may provide the content 150 to the user by using various methods. The terminal 1000 may display the content 150 in a display unit of the terminal 1000. The content 150 may include at least one selected from text, a still image, and a video. Also, the terminal 1000 may provide the content 150 in a sound.

FIGS. 22 through 25 are views illustrating a user interface through which the content 150 related to a list of famous restaurants is provided, according to another exemplary embodiment.

Figure 22:
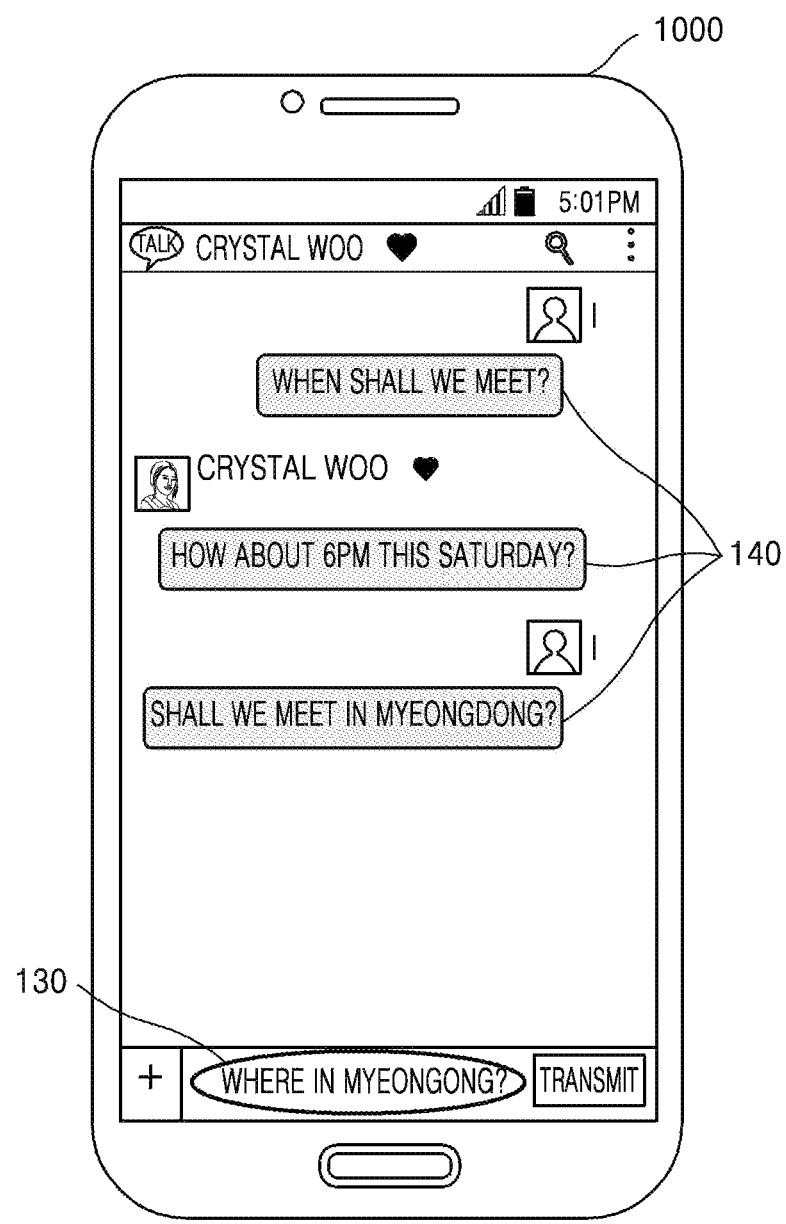

As illustrated in FIG. 22, the terminal 1000 may obtain the second message 140 stored in the terminal 1000. Here, the message stored in the terminal 1000 may include messages exchanged between users by using a messaging service. Referring to FIG. 22, the second messages 140 are "When shall we meet?", "How about 6 PM this Saturday?", and "Shall we meet in Myeongdong?" The terminal 1000 may obtain the first message 130 input in an input window of a user interface provided by a messaging application. Referring to FIG. 22, the first message 130 is "Where in Myeongdong?"

According to an exemplary embodiment, the terminal 1000 may analyze the first message 130 and the second message 140 to extract key elements. The terminal 1000 may extract "meet," "6 PM this Saturday," and "Myeongdong" as the key elements from the first message 130 and the second message 140. The terminal 1000 may determine a list of famous restaurants as a recommendation category, by considering the place and the time. As illustrated in FIG. 23, the terminal 1000 may provide the content 150 including the information of "Will I search for a list of famous restaurants?" on a screen.

The terminal 1000 may obtain the first message 130 by receiving text data in a text input window, or by receiving sound data in a sound input window as illustrated at 2310 in FIG. 23. The terminal 1000 may generate the content 150 based on the obtained sound data. Also, the terminal 1000 may convert the received sound data into text data to generate the content 150 based on the converted text data.

Figure 24:
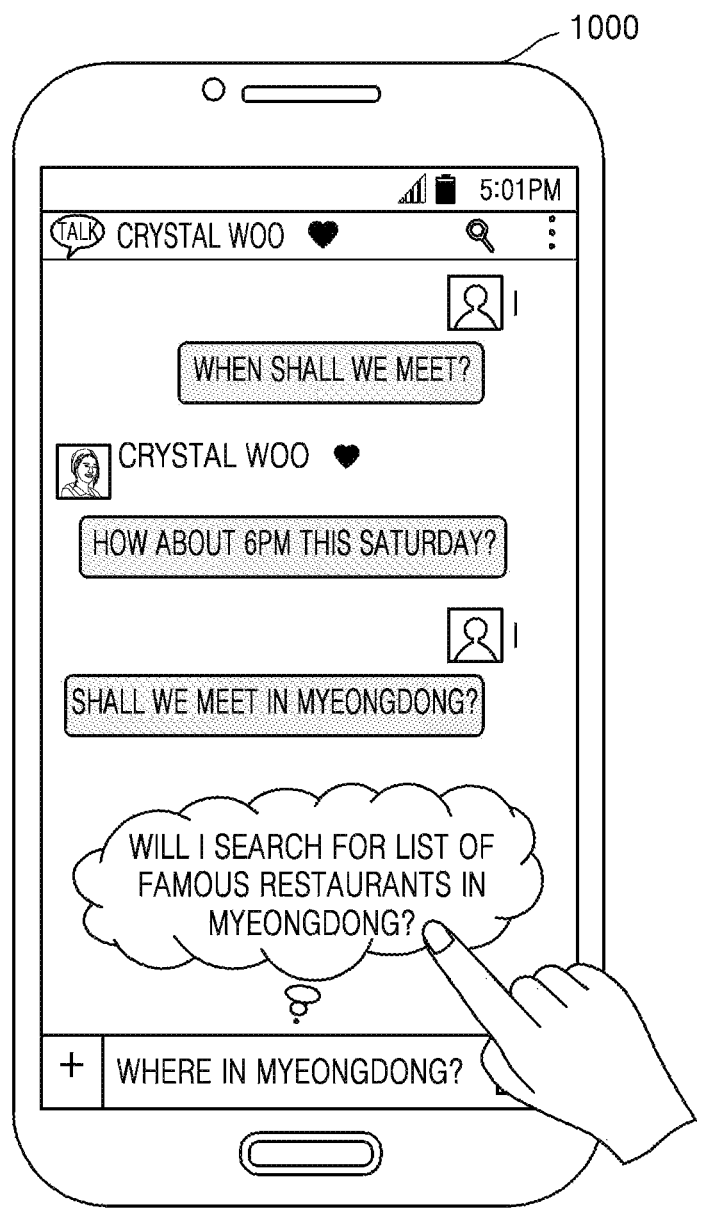

As illustrated in FIG. 24, the terminal 1000 may receive an input of selecting the content 150. The content 150 may be displayed on at least one region of a display unit included in the terminal 1000. The terminal 1000 may receive the input of selecting the content 150. For example, the terminal 1000 may include a touch screen. When the content 150 is displayed on a region of the touch screen, the terminal 1000 may receive the input of selecting the region on which the content 150 is displayed, via the touch screen. As illustrated in FIG. 24, the terminal 1000 may receive an input of selecting the content 150 of "Will I search for a list of famous restaurants in Myeongdong?" via the touch screen.

Figure 25:
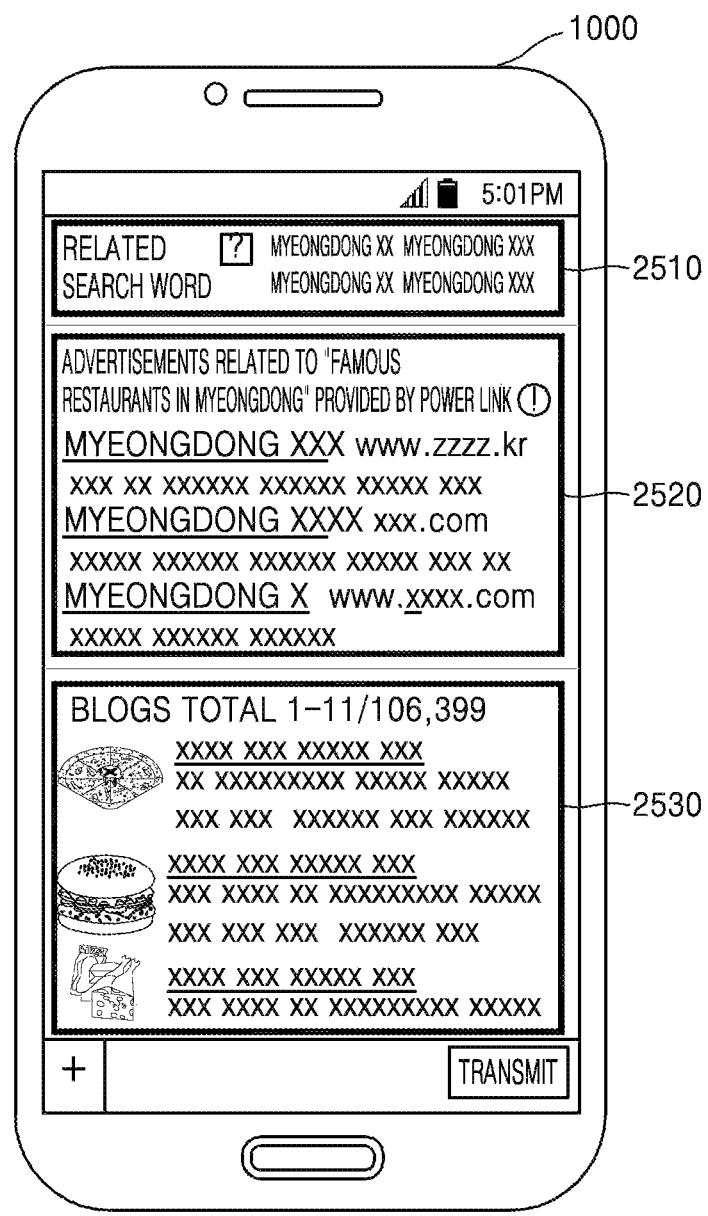

As illustrated in FIG. 25, the terminal 1000 may provide on the screen "results of searching for the list of famous restaurants in Myeongdong," the searching being performed by using at least one of a search engine installed in the terminal 1000, a search engine through a network, and information stored in the terminal 1000. For example, the terminal 1000 may provide information of related search words 2510, power links 2520, and blogs 2530.

Figure 26:
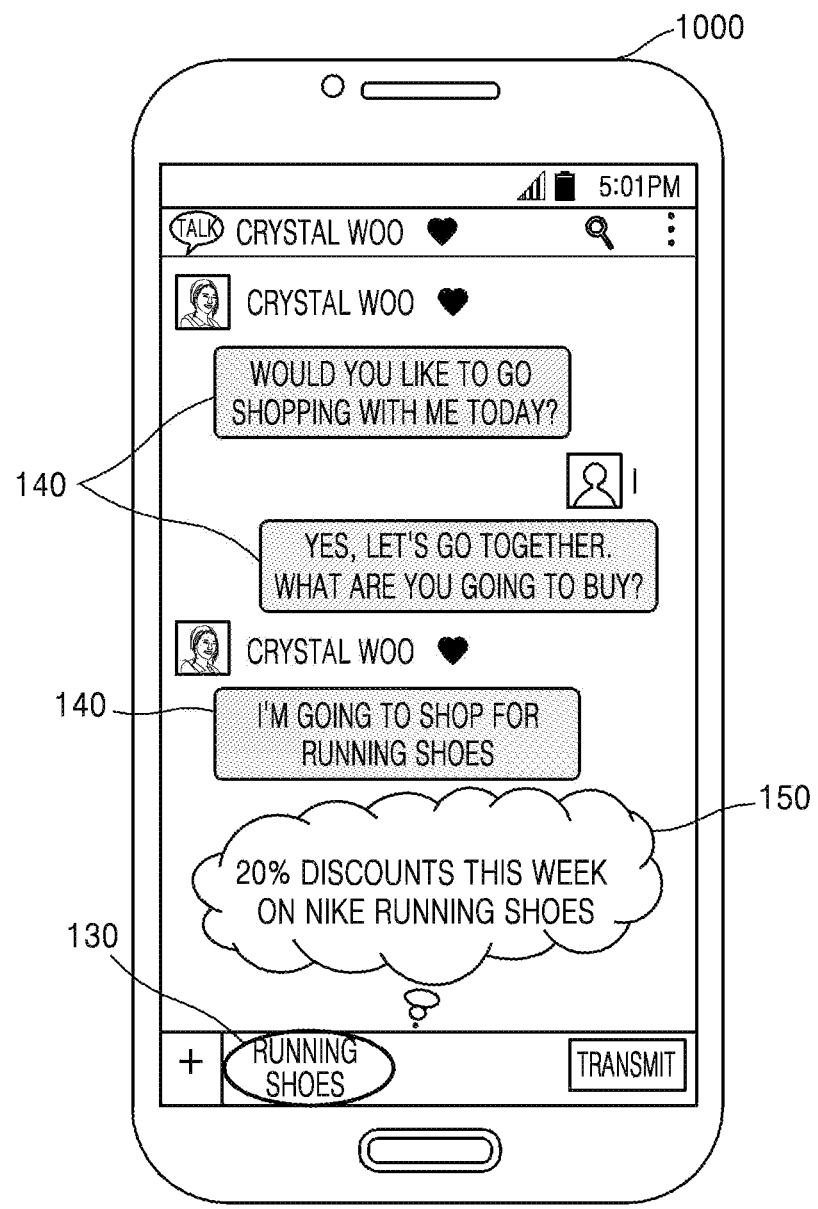

FIG. 26 is a view illustrating a user interface through which content 150 related to advertisements is provided, according to another exemplary embodiment.

As illustrated in FIG. 26, the terminal 1000 may obtain the second message 140 stored in the terminal 1000. The second messages 140 are "Would you like to go shopping with me?", "Yes, let's go together. What are you going to buy?" and "I'm going to shop for running shoes." The terminal 1000 may obtain the first message 130 input in an input window of a user interface provided by a messaging application. The first message 130 is "running shoes."

According to an exemplary embodiment, the terminal 1000 may analyze the first message 130 and the second message 140 to extract key elements. The terminal 1000 may extract "shopping" and "running shoes" as the key elements from the first message 130 and the second message 140. The terminal 1000 may consider the extracted key elements and determine an advertisement as a recommendation category. As illustrated in FIG. 26, the terminal 1000 may provide the content 150 including the information of "20% discounts this week on Nike running shoes" on a screen.

According to an exemplary embodiment, when the terminal 1000 receives an input of selecting the content 150, the terminal 1000 may provide other content 150 including specific advertisements related to "discounts on Nike running shoes." For example, other content 150 may include information related to discount items, schedules, locations, and coupons. Here, the content 150 including the specific advertisements may be received from an external device or obtained from a memory included in the terminal 1000.

Figure 27:
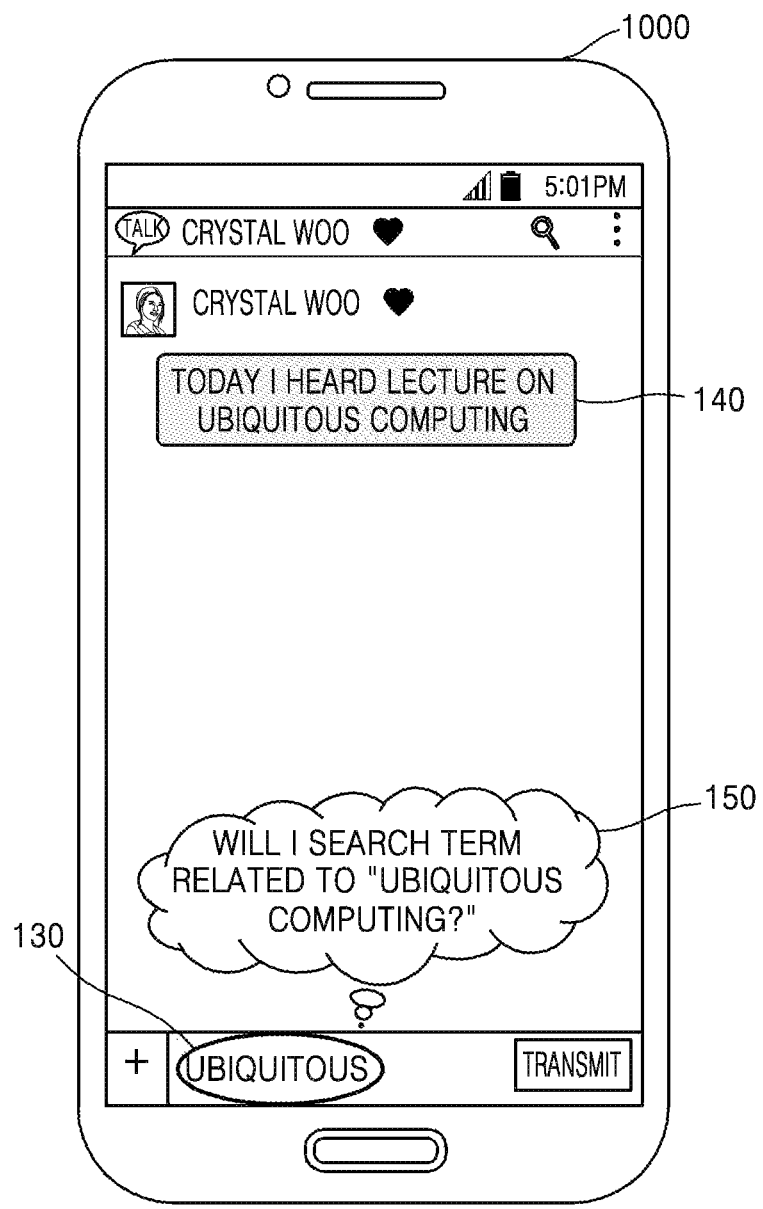
Figure 28:
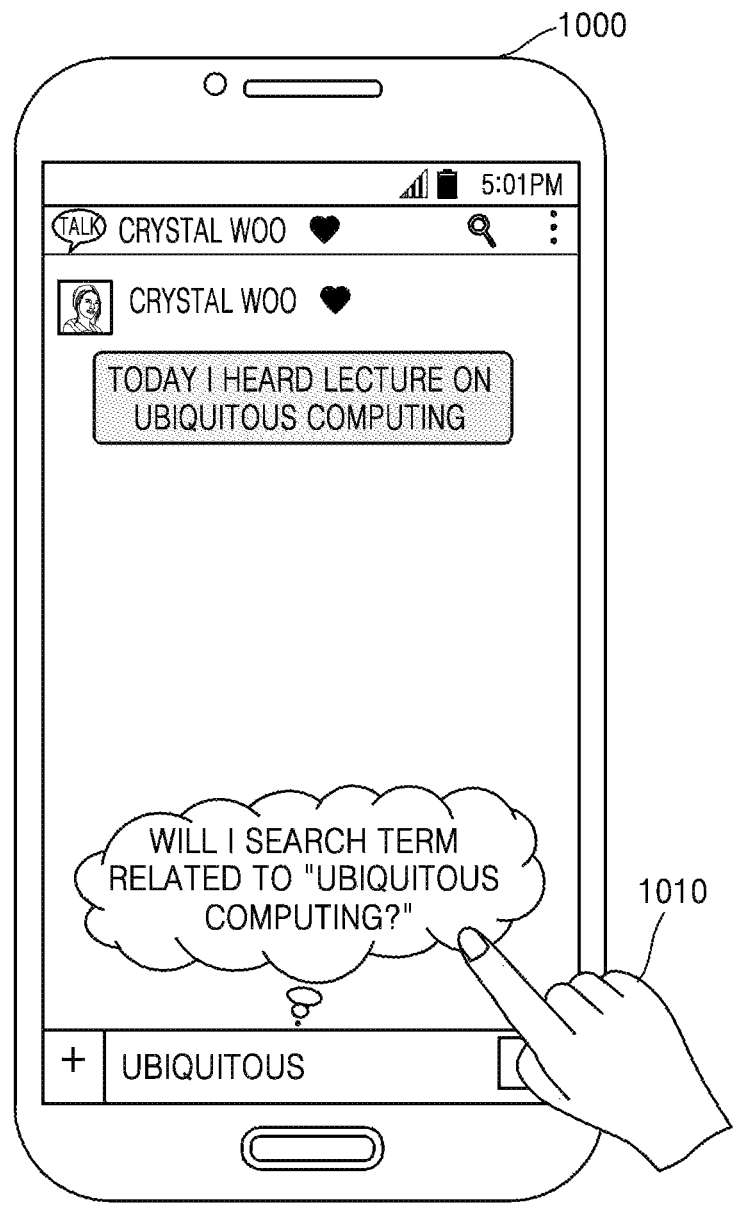
Figure 29:
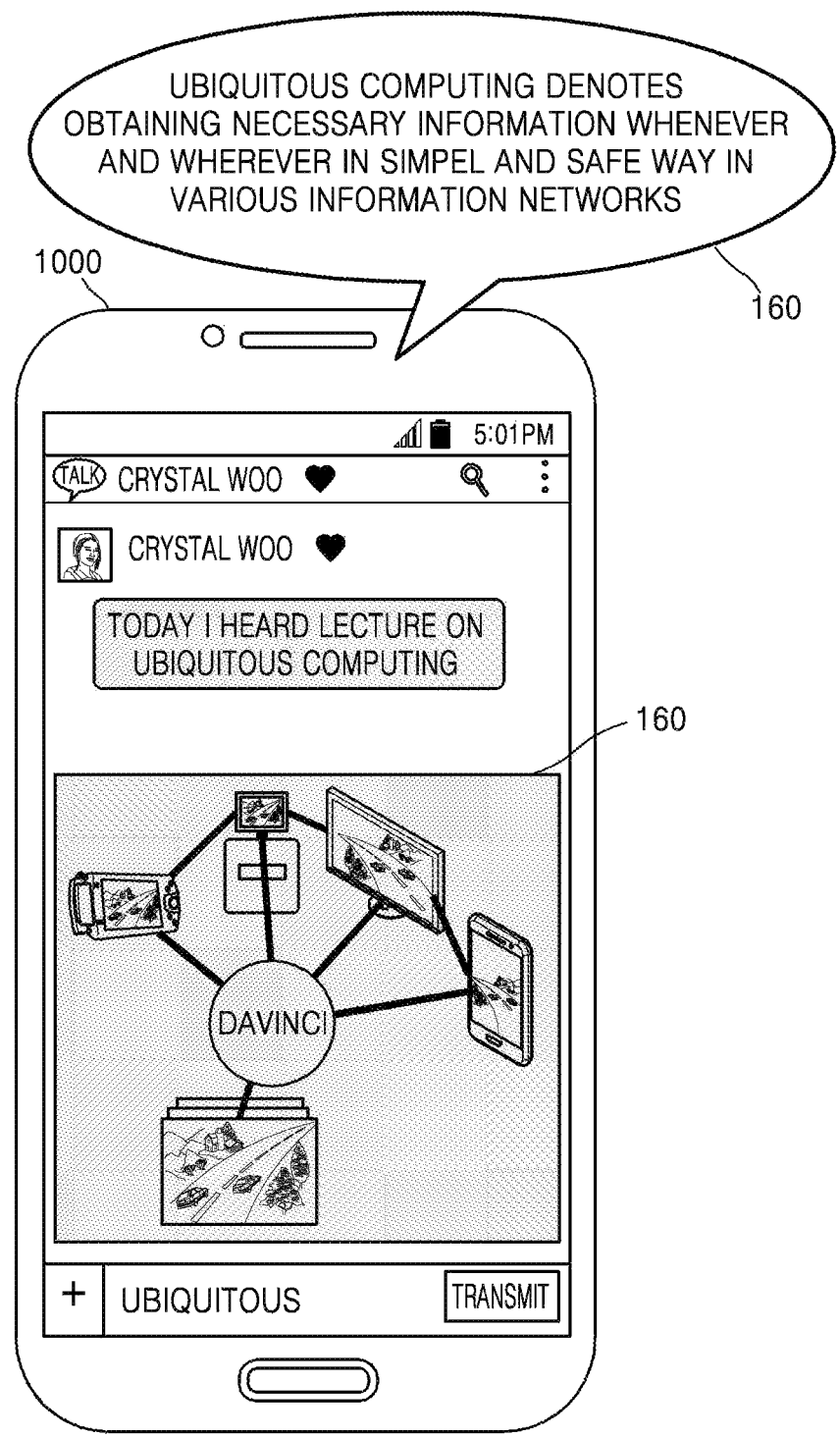

FIGS. 27 through 29 are views illustrating a user interface through which the content 150 related to dictionary functions is provided, according to another exemplary embodiment.

As illustrated in FIG. 27, the terminal 1000 may obtain the second message 140 stored in the terminal 1000. The second message 140 is "Today I heard a lecture on ubiquitous computing." The terminal 1000 may obtain the first message 130 input in an input window of a user interface provided by a messaging application. The first message 130 is "ubiquitous."

According to an exemplary embodiment, the terminal 1000 may analyze the first message 130 and the second message 140 to extract key elements. The terminal 1000 may extract "ubiquitous," "computing," and "a lecture" as the key elements from the first message 130 and the second message 140. The terminal 1000 may determine a dictionary function as a recommendation category by considering the extracted key elements. For example, when the key elements extracted from the first message 130 and the second message 140 are not words that are pre-configured, or are newly entered words, the terminal 1000 may determine a dictionary function as the recommendation category. The terminal 1000 may provide the content 150 including the information of "Will I search a term related to ubiquitous computing?" on a screen.

As illustrated in FIG. 28, the terminal 1000 may receive an input of selecting the content 150. When the content 150 is displayed on a region of a touch screen, the terminal 1000 may receive the input of selecting the region on which the content 150 is displayed, via the touch screen. The terminal 1000 may receive the input 1010 of selecting the content 150 including the information of "Will I search a term related to ubiquitous computing?"

As illustrated in FIG. 29, the terminal 1000 may provide a search result 160 related to "ubiquitous computing" in response to the input of selecting the content 150. The terminal 1000 may display a description related to the "ubiquitous computing" on the screen of the terminal 1000. Also, the terminal 1000 may provide a term definition with respect to the "ubiquitous computing" in a sound and/or a text.

Figure 30:
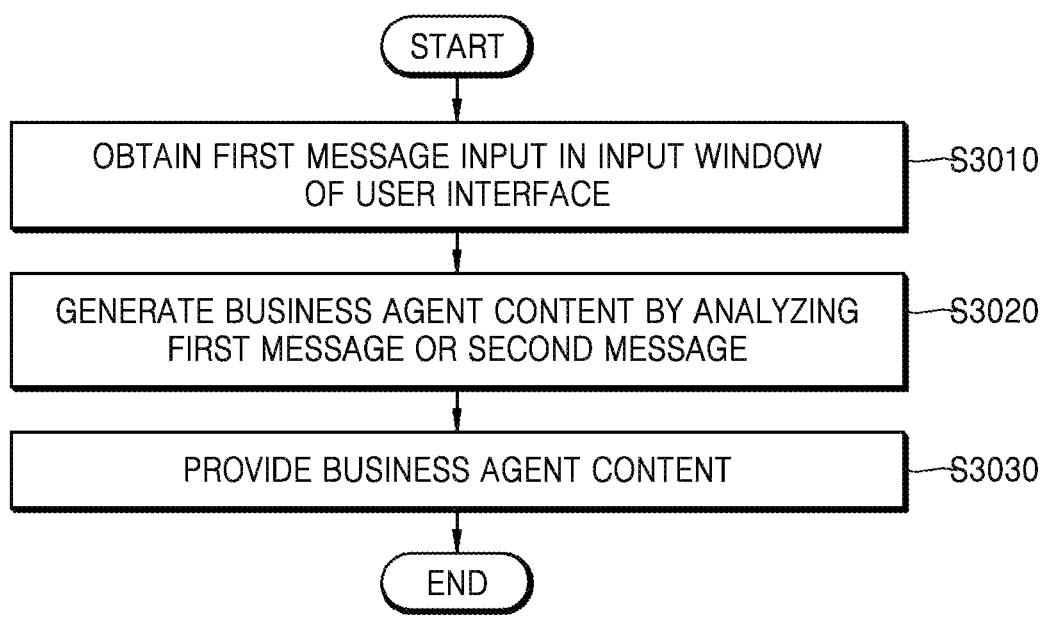
FIG. 30 is a flowchart illustrating a method of providing content, according to another exemplary embodiment.

FIG. 30 is a flowchart of a method of providing the content 150, according to another exemplary embodiment.

As illustrated in FIG. 30, in operation S3010, the terminal 1000 may obtain a first message input in the input window. Next, in operation S3020, the terminal 1000 may analyze the first message 130 or the second message 140 and generate business agent content 150 in operation. Here, the business agent refers to the function that the terminal 1000 analyzes the first message 130 or the second message 140, and performs a business that has to be performed by a user, instead of the user, even if there is no active performance of the user with respect to the business. For example, according to the business agent, when the user has to transmit a first file to a terminal of another user, the terminal 1000 directly searches for the first file in the terminal 1000 and transmits the first file to the terminal of the other user even if the user does not directly search for the first file and transmit the first file to the terminal of the other user.

The business agent content 150 refers to the content 150 provided to the user in order to perform the business agent. According to an exemplary embodiment, the first message 130 is a message input in an input window of a user interface provided by a messaging application. The second message 140 is a message stored in the terminal 1000.

In operation S3030, the terminal 1000 may provide the generated business agent content 150 to the user.

FIGS. 31 through 34 are views illustrating a user interface that is provided in a process of performing the business agent via the terminal 1000, according to an exemplary embodiment.

According to an exemplary embodiment, the terminal 1000 may obtain messages exchanged between users through a messaging application. Here, the messages may be at least one of the first message 130 input in an input window provided by the messaging application and the second messages 140 stored in the terminal 1000 (for example, the message stored in a conversation window provided by the messaging application). Here, types of the message data may correspond to at least one selected from text data, sound data, and image data.

According to an exemplary embodiment, the terminal 1000 may analyze the first message 130 or the second message 140 to extract key elements. The terminal 1000 may extract the key elements according to a criterion that is pre-configured according to the types of the message data. For example, the pre-configured criterion may include extracting a pre-configured keyword for text data, extracting a pre-configured sound element for sound data, and performing image recognition for image data, so that information included in the first message 130 and the second message 140 are obtained.

Figure 31:
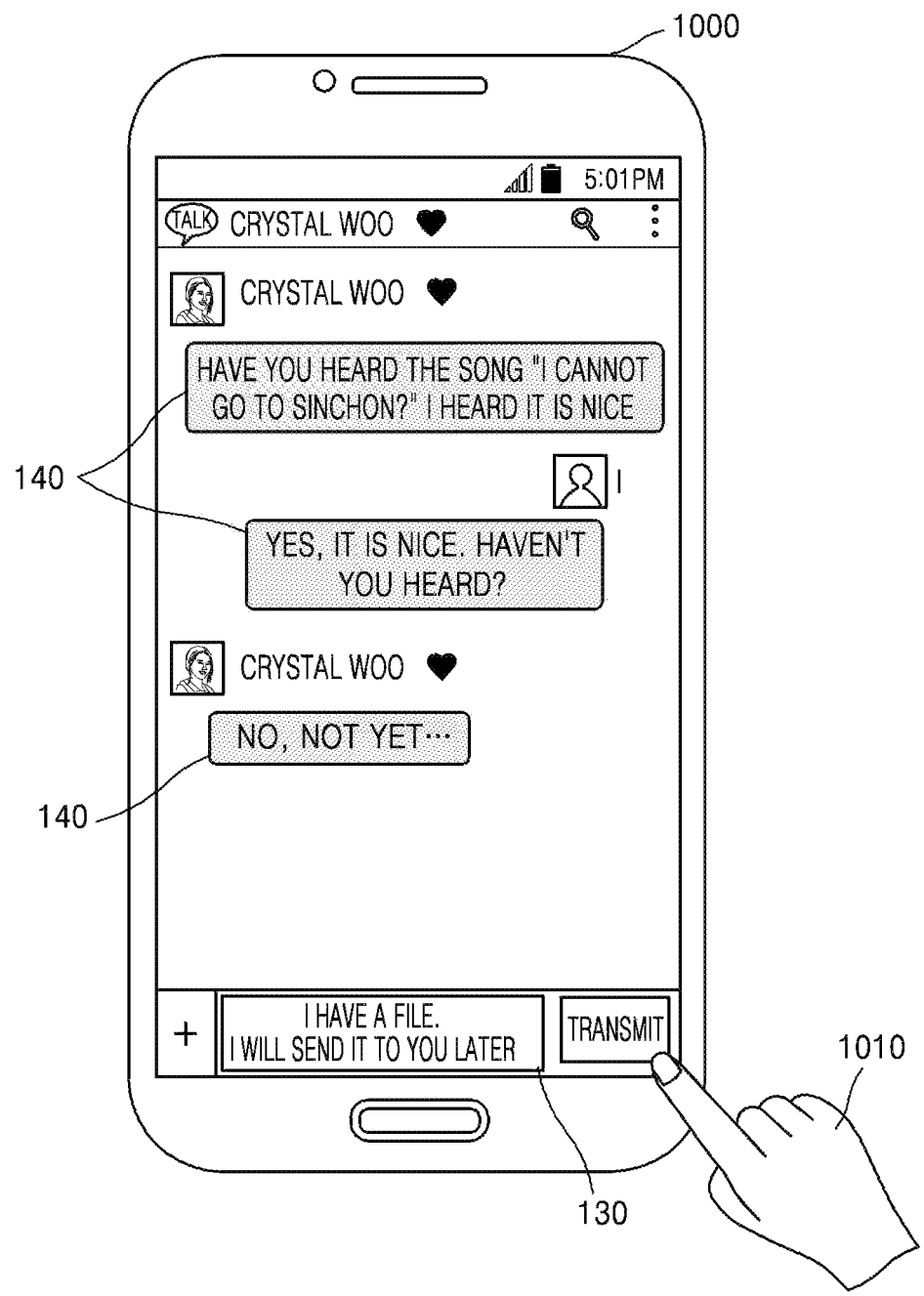
FIGS. 31 through 38 are views illustrating a user interface through which content is provided, according to another exemplary embodiment.

Referring to FIG. 31, the terminal 1000 may obtain the second message 140 stored in the user interface (for example, a conversation window) provided by the messaging application. Also, the terminal 1000 may obtain the first message 130 input in the input window. The terminal 1000 may analyze the obtained first message 130 and the second messages 140 and extract "I cannot go to Sinchon," "a file," and "transmit to you" as the key elements. The terminal 1000 may realize a process in which the file is transmitted to the terminal 1000 of the other user based on the key elements, without receiving a user's command input.

Figure 32:
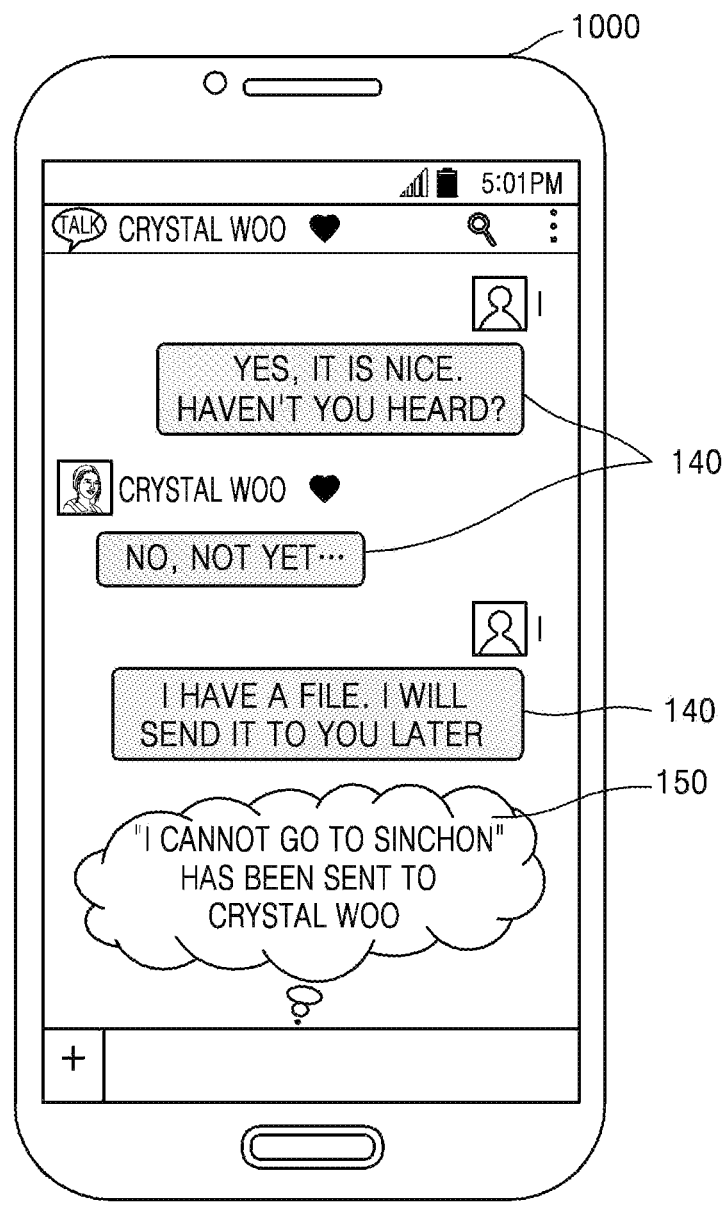

Referring to FIG. 32, the terminal 1000 may transmit the message that "I have a file, I will send it to you later" and at the same time the content 150 indicating the completion of the file transmission to the terminal 1000 of the other user. That is, upon selecting a button for transmitting the first message 130 input in the input window of the terminal 1000, the terminal 1000 may analyze the first message 130 and the second message 140 and perform the business agent, according to the information included in the first message 130 and the second message 140. A result of performing the business agent may be displayed on at least one region of a display unit of the terminal 1000 or may be output by a sound output unit included in the terminal 1000.

Figure 33:
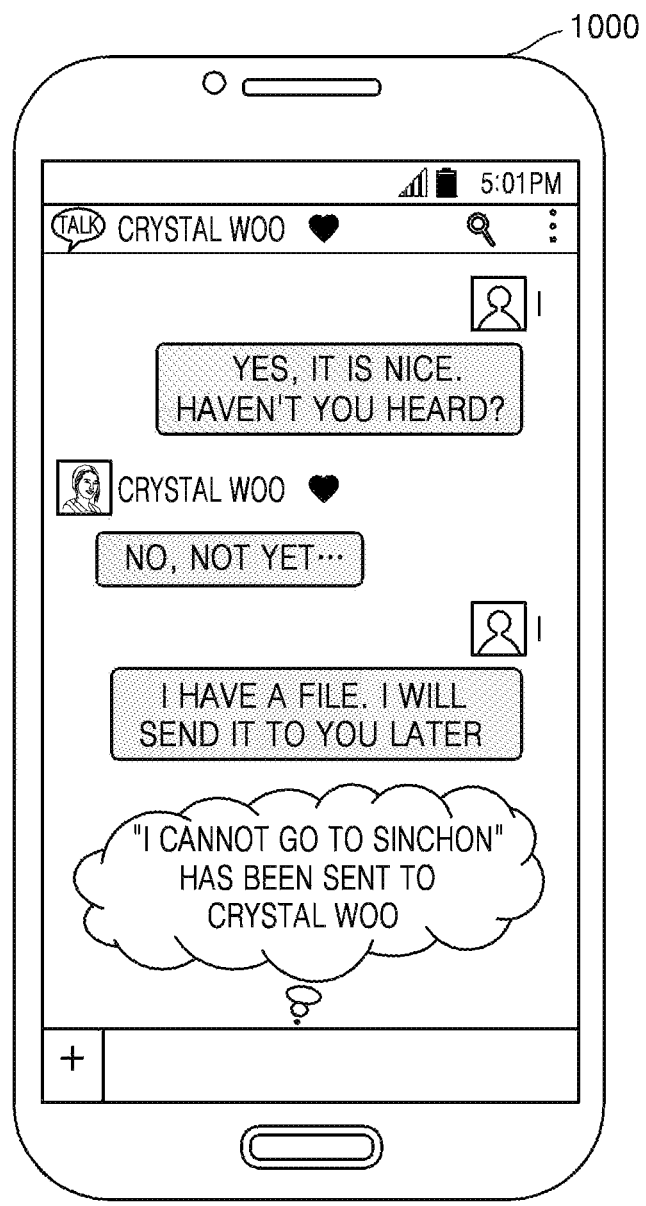
Figure 34:
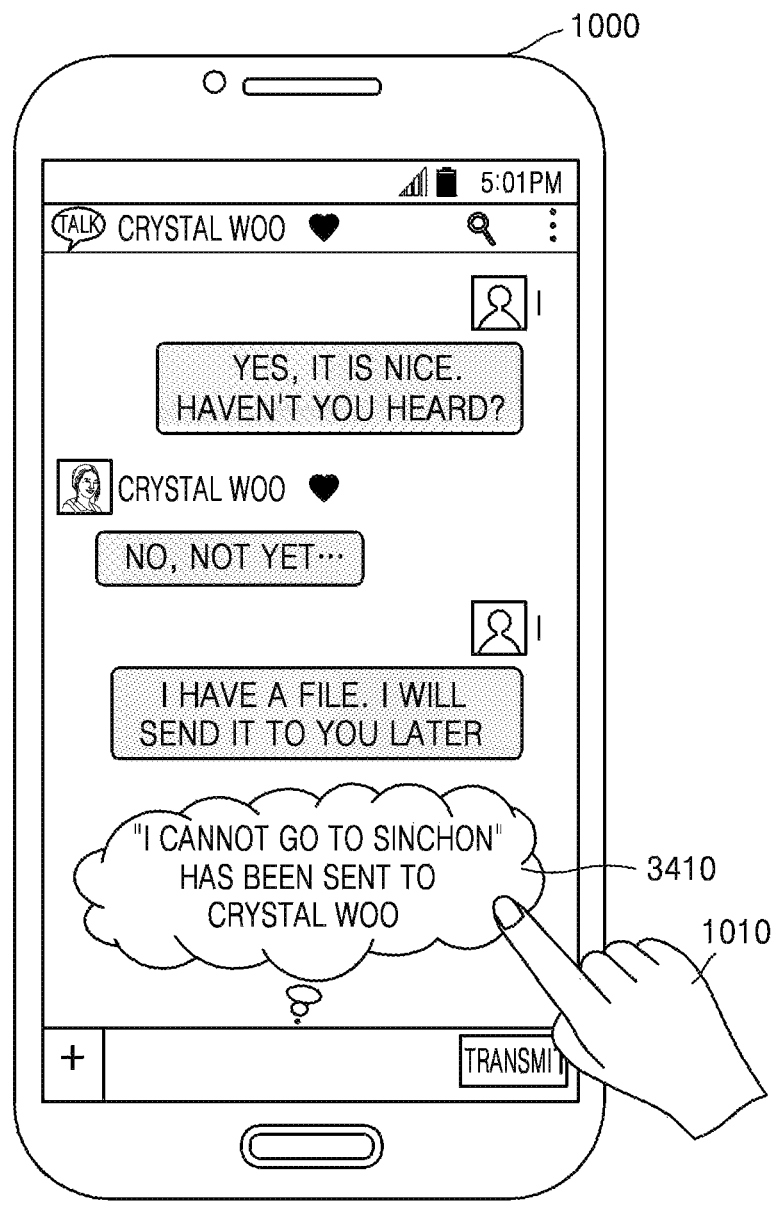

Referring to FIGS. 33 and 34, when receiving a response with respect to the provided content 150, the terminal 1000 may execute a command with respect to the response. When receiving a command of file transmission, the terminal 1000 may execute the file transmission 3410 to the terminal 1000 of the other user.

FIGS. 35 through 39 are views for describing a user interface that is provided in a process of executing a business agent via the terminal 1000, according to another exemplary embodiment.

According to an exemplary embodiment, the terminal 1000 may analyze the first message 130 and the second message 140 and may invite another user to the present conversation window by using a messaging application or create a new conversation window to invite another user.

Figure 35:
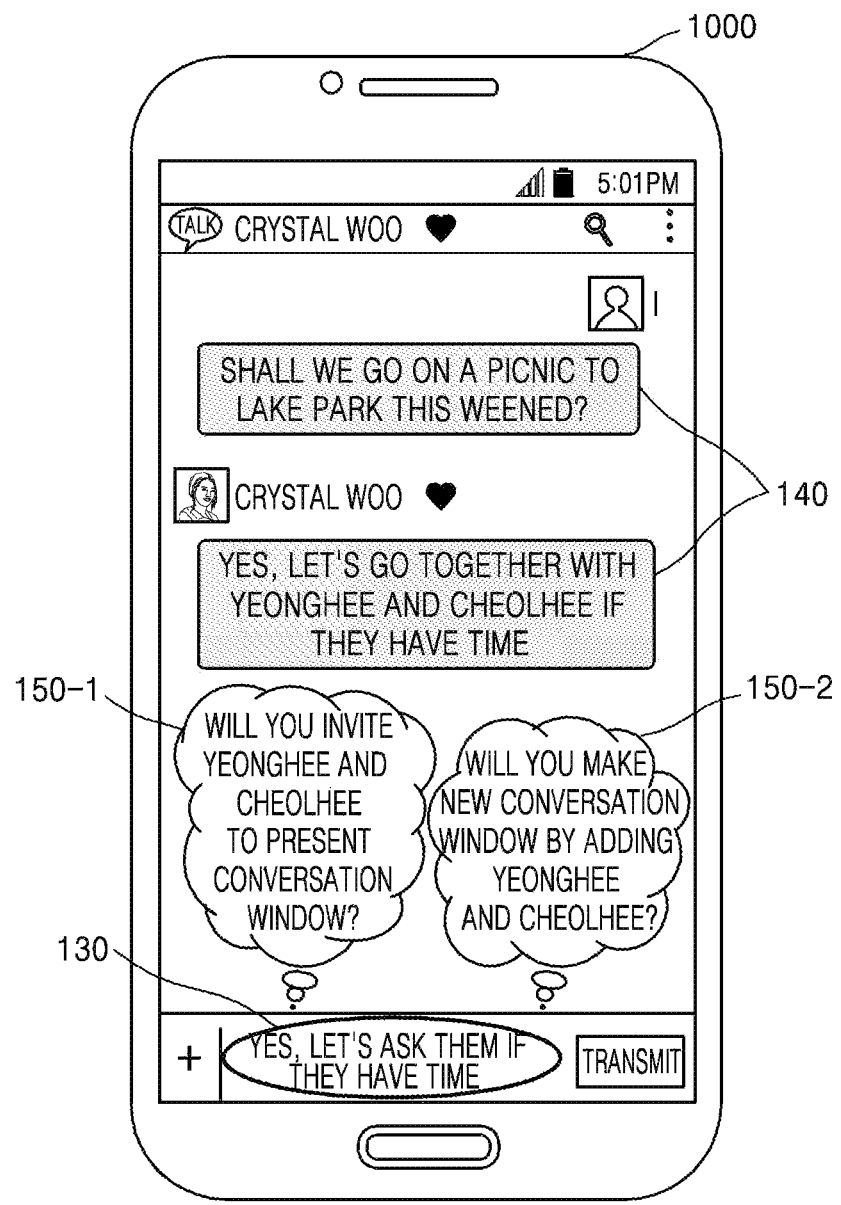

Referring to FIG. 35, the terminal 1000 may obtain the second message 140 stored in the terminal 1000. The second message 140 is "Shall we go on a picnic to a lake park this weekend?" and "Yes, let's go together with Yeonghee and Cheolhee if they have time." Also, the terminal 1000 may obtain the first message 130 input in an input window of the terminal 1000. The first message 130 is "Yes, let's ask them if they have time." The terminal 1000 may extract "a lake park," "Yeonghee," and "Cheolhee" as the key elements based on the first message 130 and the second message 140 and may provide the content 150-1 and 150-2 receiving a command input of conversation invitation so that users participating in the present conversation may converse with "Yeonghee" and "Cheolhee." The terminal 1000 may provide the content 150-1 and 150-2 receiving the command input of conversation invitation, on a region of a display unit included in the terminal 1000. For example, the terminal 1000 may provide the content 150-1 inviting another user to the present conversation window and the content 150-2 inviting another user to a new conversation window, on a screen of the terminal 1000.

Figure 36:
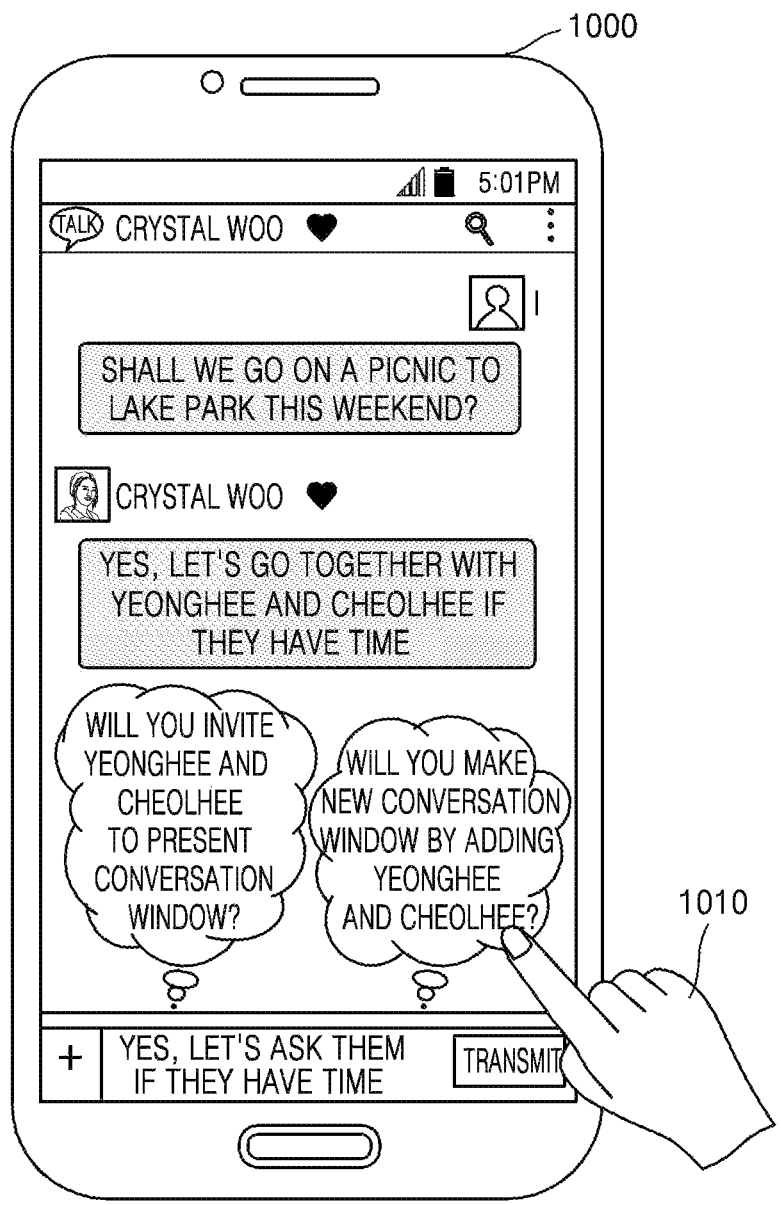
Figure 37:
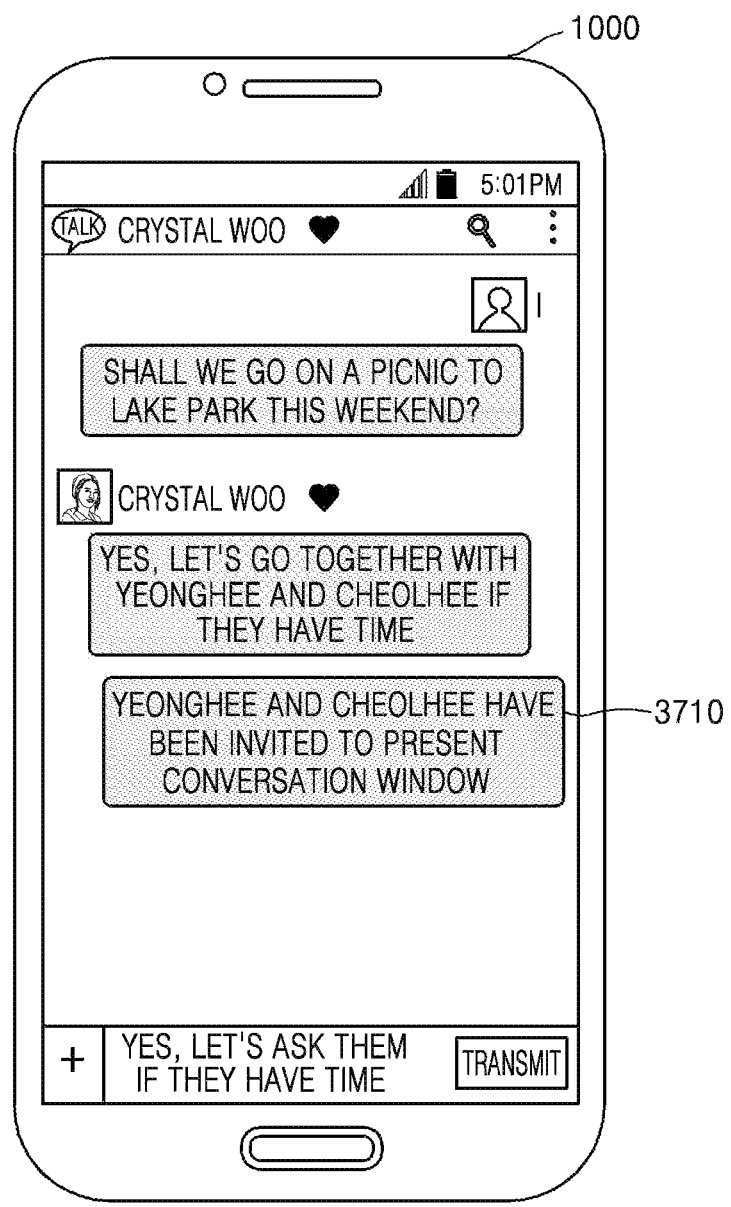

Referring to FIGS. 36 and 37, when the terminal 1000 receives an input of selecting the content 150-1 inviting another user to the present conversation window, the terminal 1000 invites the other user to the conversation window in which existing users converse with one another. For example, when the terminal 1000 receives an input of "Will you invite Yeonghee and Cheolhee to the present conversation window?" the terminal 1000 invites Yeonghee and Cheolhee to the present conversation window. The terminal 1000 invites Yeonghee and Cheolhee and may provide content 3710 that "Yeonghee and Cheolhee are invited to the present conversation window."

Figure 38:
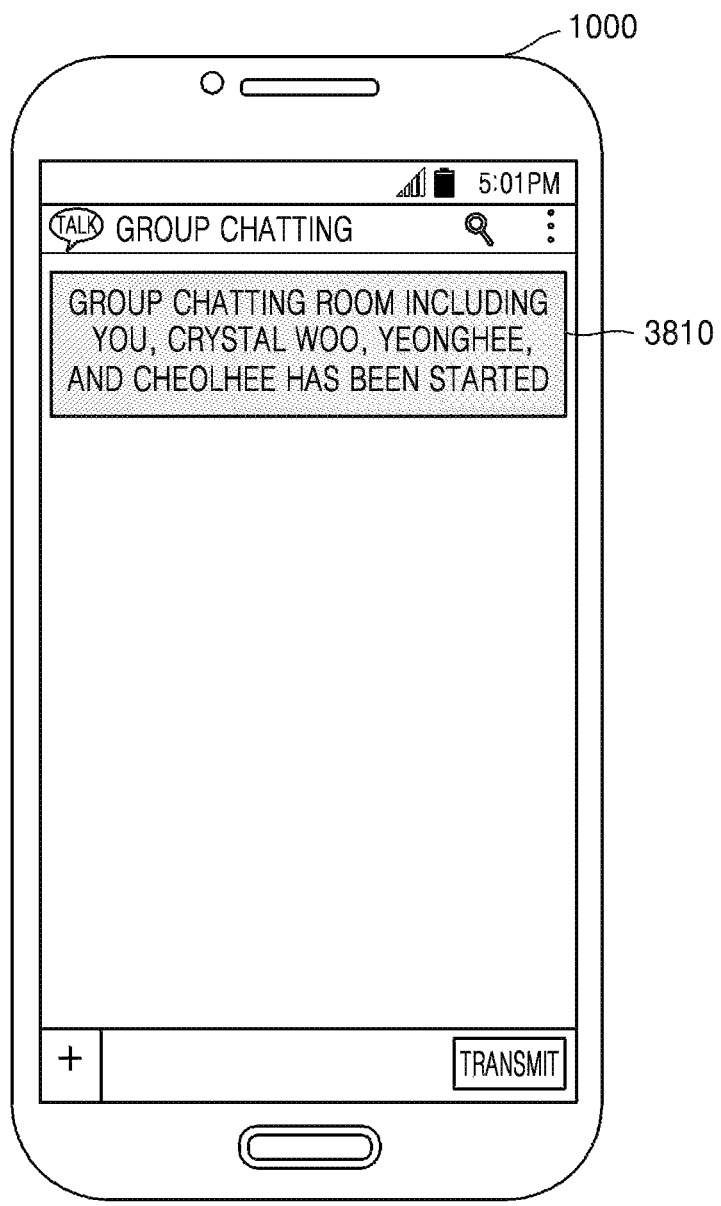

Referring to FIGS. 36 and 38, when the terminal 1000 receives an input of selecting the content 150-2 inviting other users to a new conversation window, the terminal 1000 invites the users to a new conversation window instead of the present conversation window in which existing users converse with one another. For example, when the terminal 1000 receives the input of "Will you make a new conversation window by adding Yeonghee and Cheolhee?" the terminal 1000 may establish a new conversation window by including user of terminal 1000, Crystal Woo, Yeonghee, and Cheolhee. The terminal 1000 may provide content 3810 that "A group chatting room including you, Crystal Woo, Yeonghee, and Cheolhee has been made."

Figure 39:
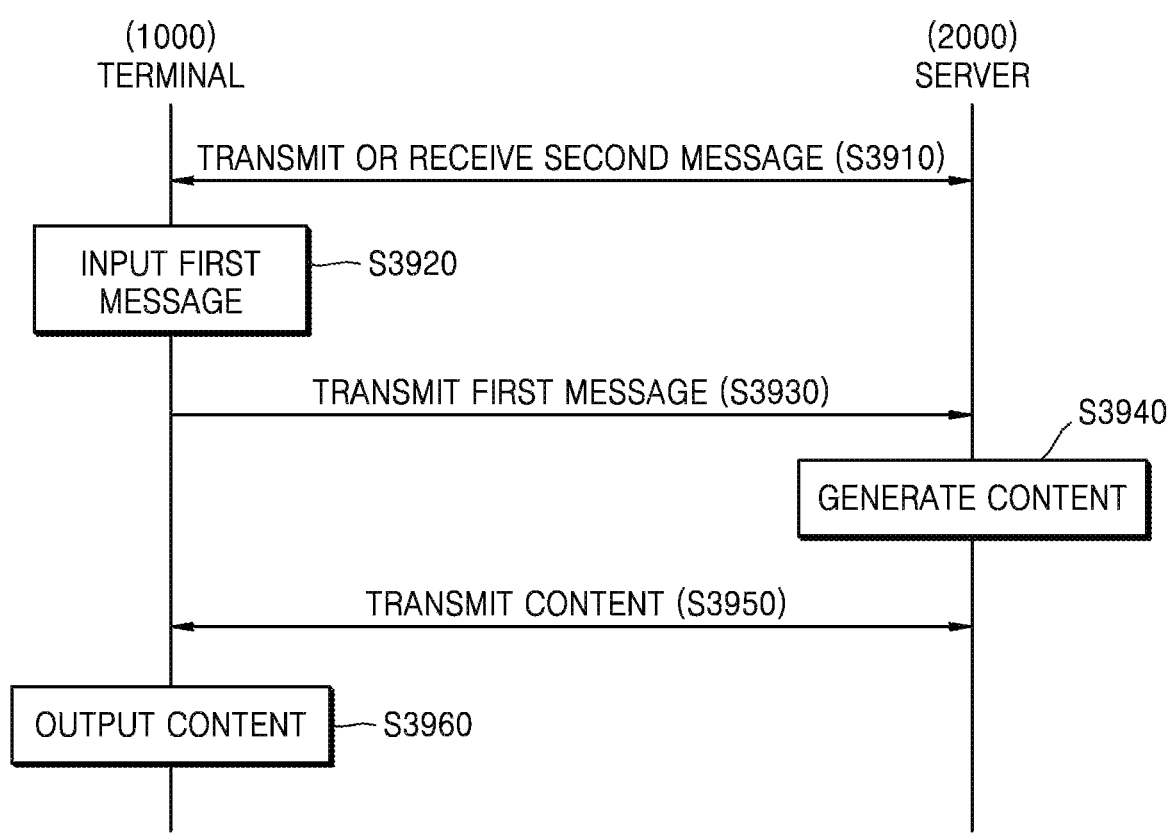
FIG. 39 is a flowchart illustrating a method of providing content, according to another exemplary embodiment.

FIG. 39 is a flowchart of a method of providing the content 150, according to another exemplary embodiment.

The terminal 1000 may provide the content 150 by using a messaging service. A messaging service system for providing the messaging service may include the terminal 1000 and a server 2000.

As illustrated in FIG. 39, the terminal 1000 may transmit the second message 140 to the server 2000 or receive the second message 140 from server 2000, in operation S3910. In this case, the server 2000 may store the second message 140 that is transmitted or received as a message history.

In operation S3920, the terminal 1000 may receive the first message 130 from user.

In operation S3930, the terminal 1000 may transmit the first message 130 that is input to the server 2000. Here, the first message 130 has to be distinguishable from the second message 140 that the server 2000 has to transmit to another terminal 1000. For example, the terminal 1000 may also transmit a flag for distinguishing the first message 130 from the second message 140 to the server 2000. According to an exemplary embodiment, when the server 2000 does not store the second message 140, the terminal 1000 may transmit the second message 140 together with the first message 130.

In operation S3940, the server 2000 may generate the content 150 based on the first message 130 and the second message 140. Here, the server 2000 may obtain information included in the first message 130 and the second message 140 and compare the information included in the first message 130 and the second message 140 with user information of the terminal 1000. The server 2000 may generate the content 150 based on a result of the comparison.

In operation S3950, the server 2000 may transmit the generated content 150 to the terminal 1000.

In operation S3960, the terminal 1000 that received the content 150 may output the received content 150 in the terminal 1000.

Figure 40:
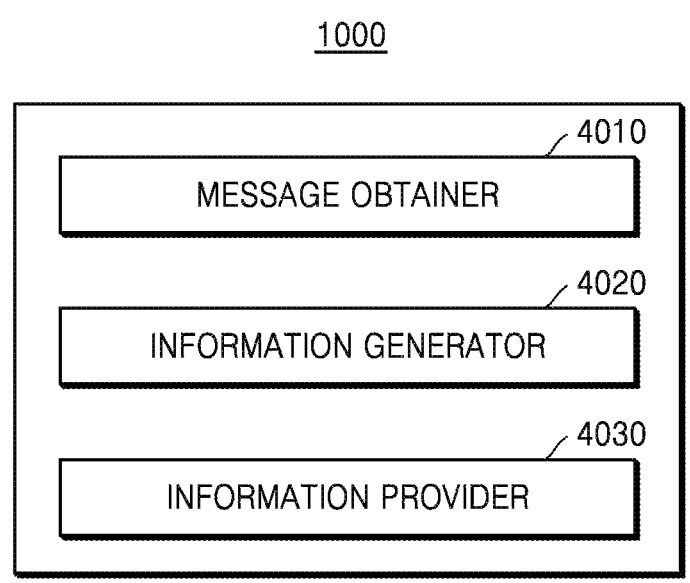
FIGS. 40 and 41 are block diagrams illustrating a configuration of a terminal, according to an exemplary embodiment.
Figure 41:
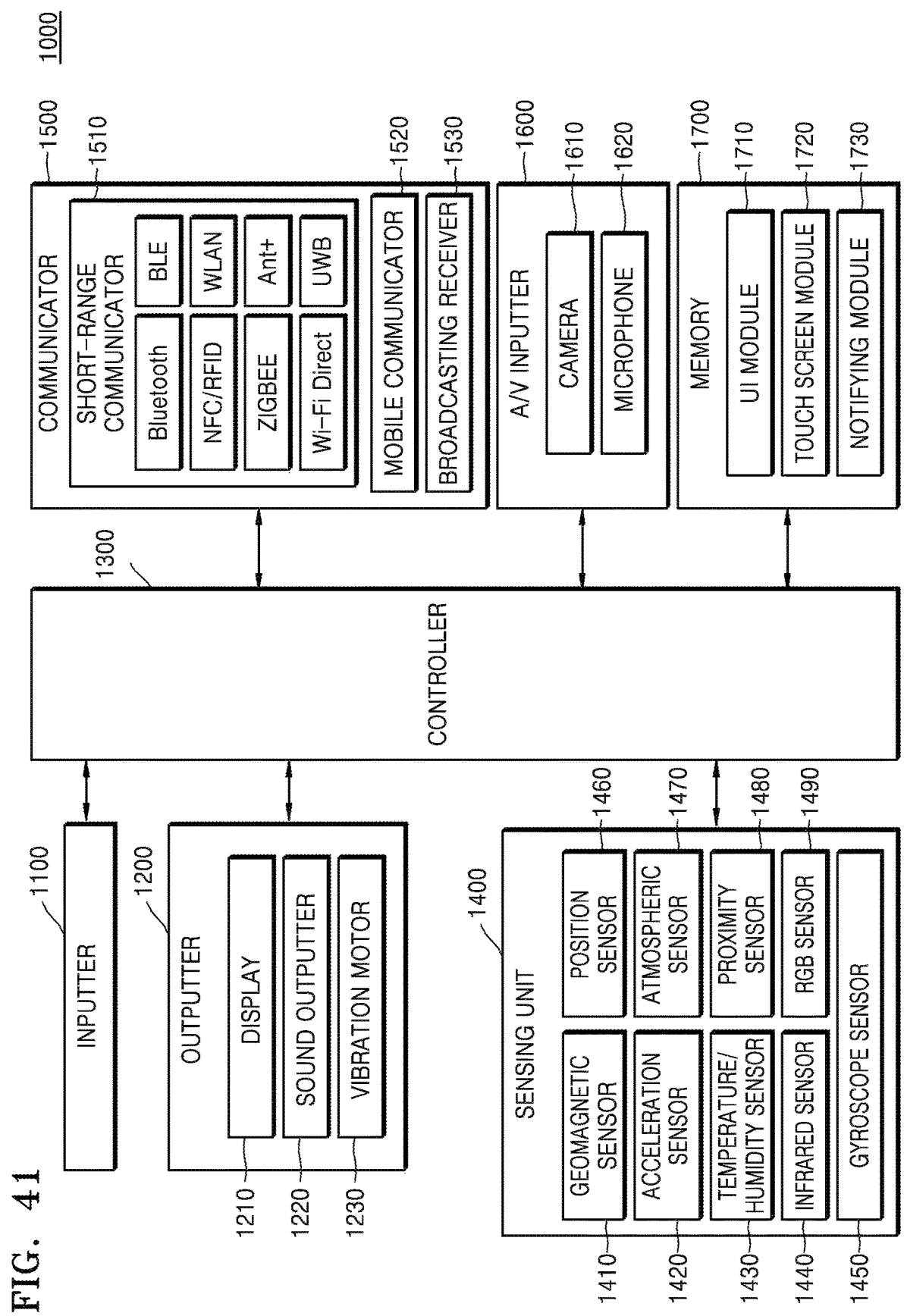

FIGS. 40 and 41 are block diagrams of configurations of the terminal 1000, according to an exemplary embodiment. An exemplary embodiment illustrated in FIGS. 40 and 41 is only exemplary, and the terminal 1000 may be formed of more or less configurations than the terminal 1000 illustrated in FIGS. 40 and 41.

According to an exemplary embodiment, the terminal 1000 may include a message obtaining unit (i.e., message obtainer) 4010, an information generation unit (i.e., information generator) 4020, and an information providing unit (i.e. information provider) 4030. However, not all of the illustrated configurations are essential. The terminal 1000 may include more or less configurations than the illustrated terminal 1000. Hereinafter, the configurations will be described in detail.

According to an exemplary embodiment, a controlling unit (i.e., controller) 1300 illustrated in FIG. 41 may correspond to the message obtaining unit 4010 and the information generation unit 4020 illustrated in FIG. 40. An output unit 1200 illustrated in FIG. 41 may correspond to the information providing unit 4030 illustrated in FIG. 40.

According to an exemplary embodiment, the message obtaining unit 4010 may obtain the first message 130 and the second message 140. The first message 130 is a message input in an input window of a user interface provided by a messaging application used for a messaging service. The second message 140 is a message stored in the terminal 1000. The first message 130 and the second message 140 may correspond to at least one selected from text data, sound data, and image data.

According to an exemplary embodiment, the message obtaining unit 4010 may obtain a message provided by a first terminal 1000 that is different from the terminal 1000 through the messaging application, as the second message 140.

According to an exemplary embodiment, the information generation unit 4020 may analyze the first message 130 and the second message 140 and generate the content 150. The information generation unit 4020 may obtain information included in the first message 130 and the second message 140, and may generate the content 150 based on the information included in the first message 130 and the second message 140. For example, the information generation unit 4020 may compare user information of the terminal 1000 and the information included in the first message 130 and the second message 140 to generate the content 150.

According to an exemplary embodiment, the information generation unit 4020 may obtain the information included in the first message 130 and the second message 140 according to a criterion that is pre-configured in correspondence to the first message 130 and the second message 140. Here, the pre-configured criterion may include extracting a pre-configured keyword for text data, extracting a pre-configured sound element for sound data, and performing image recognition for image data so that the information included in the first message 130 and the second message 140 may be obtained.

According to an exemplary embodiment, the information providing unit 4030 may provide the generated content 150 through the messaging application. The information providing unit 4030 may display the content 150 on a different layer than a layer of the user interface provided by the messaging application.

According to an exemplary embodiment, the terminal 1000 may include a central processing unit (CPU) to control overall operations of the message obtaining unit 4010, the information generation unit 4020, and the information providing unit 4030. The CPU may be formed of an array of a plurality of logic gates or may be formed of a combination of a microprocessor and a memory in which a program executable in the microprocessor is stored. Also, it will be understood by one of ordinary skill in the art that the CPU may be formed using different forms of hardware.

According to an exemplary embodiment, the input unit 1100 (i.e., inputter) may receive an input of the first message 130. Also, the output unit (i.e., outputter) 1200 may output the first message 130 that is input, the second message 140, the content 150, and an input region. Although FIG. 41 illustrates the input unit 1100 and the output unit 1200 as separate components, the input unit 1100 and the output unit 1200 may be formed as one hardware element, such as a touch screen in which a display unit and a touch pad are formed in layer.

The input unit 1100 is a device used to input data to control the terminal 1000. For example, the input unit 1100 may be a key pad, a dome switch, a touch pad (using a touch-type capacitance method, a pressure-type resistive method, an infrared sensing method, a surface ultrasonic conductive method, an integral tension measuring method, a piezo effect method, etc.), a jog wheel, or a jog switch. However, the input unit 1100 is not limited thereto. Also, the input unit 1100 may include an A/V input unit (i.e. A/V inputter) 1600 of FIG. 41.

The output unit 1200 may output an audio signal, a video signal, or a vibration signal. The output unit 1200 may include a display unit 1210, a sound output unit (i.e., sound outputter) 1220, and a vibration motor 1230. Here, the output unit 1200 illustrated in FIG. 41 may correspond to the information providing unit 4030 illustrated in FIG. 40.

The display unit 1210 may include at least one selected from a liquid crystal display, a thin film transistor-liquid crystal display, an organic light-emitting diode, a flexible display, a 3D display, and an electrophoretic display. Also, the terminal 1000 may include two or more display units 1210, according to types of the terminal 1000. Here, two or more display units 1210 may be arranged to face each other by using a hinge. The display unit 1210 may display the user interface illustrated in FIG. 41, however, it is not limited thereto.

The sound output unit 1220 may output audio data received from a communication unit (i.e. communicator) 1500 or stored in a memory 1700. Also, the sound output unit 1220 outputs sound signals (for example, a call signal reception sound, a message reception sound, and an alarm sound) related to functions performed in the terminal 1000. The sound output unit 1220 may include a speaker or a buzzer.

The vibration motor 1230 may output a vibration signal. For example, the vibration motor 1230 may output the vibration signal corresponding to an output of audio data or video data (for example, the call signal reception signal, the message reception signal, etc.). Also, the vibration motor 1230 may output the vibration signal when a touch is input in a touch screen.

The controlling unit 1300 may control overall operations of the terminal 1000. For example, the controlling unit 1300 may execute a program stored in the memory 1700, in order to control the configurations included in the terminal 1000 to operate. Here, the controlling unit 1300 illustrated in FIG. 41 may correspond to the message obtaining unit 4010 and the information generating unit 4020 illustrated in FIG. 40.

In detail, when the first message 130 is input via the input unit 1100, the controlling unit 1300 may obtain information included in the second message 140 and personal information of the user of the terminal 1000, via the information obtaining unit 1310. The controlling unit 1300 may generate the content 150 based on the information included in the first message 130 and the second message 140 and the personal information. According to an exemplary embodiment, the information included in the first message 130 and the second message 140 may be obtained by using a natural language interpretation with respect to each message. For example, when the first message 130 and the second message 140 include such words as "meet?", "Friday," and "6 PM," it may be interpreted such that the first message 130 and the second message 140 include information related to generating a schedule at 6 PM on Friday between message exchangers. Here, the personal information refers to information included in user's schedules, memos, contact information, location information, mails, social network services (SNS), and calendars. The personal information may be information stored in the memory 1700 in the terminal 1000 or may be information received from a cloud server or a PIMS server via the information obtaining unit 1310.

Also, according to an exemplary embodiment, the controlling unit 1300 may generate the content 150 based on profile information of a conversation participant related to the second message 140. Here, the conversation participant related to the second message 140 refers to a user of a messaging service that transmits or receives the second message 140. For example, when a group conversation in an instant messaging service is used, the conversation participant related to the second message 140 may be users included in the group. Also, the profile information may refer to summary information related to the conversation participants. For example, the profile information may include at least one selected from the conversation participants' addresses, hobbies, preferences, and relationships with the user of the terminal 1000. However, the profile information is not limited thereto.

Also, according to an exemplary embodiment, the second message 140 may include sound data or image data. When the second message 140 includes sound data or image data, the controlling unit 130 may obtain information included in the second message 140 by using sound recognition or image recognition with respect to the sound data or the image data.

Also, the controlling unit 130 may obtain the content 150 from an external device, such as a server providing a messaging service. The controlling unit 130 may transmit the first message 130 to the external device through the communication unit 1500 and receive from the external device the content 150 generated based on the first message 130, the second message 140, and the personal information. Here, when the second message 140 or the personal information is not stored in the external device, the controlling unit 1300 may transmit the second message 140 or the personal information together with the first message 130 to the external device, via the communication unit 1500.

According to an exemplary embodiment, the content 150 generated by the controlling unit 1300 may include at least one selected from time information, location information, and advertisement information. For example, when the content 150 is related to schedule information, the content 150 may include time information indicating time with respect to schedules. According to another example, when the content 150 is related to an appointment place, the content 150 may include location information, such as an address or a map indicating the appointment place. According to another example, the content 150 may include advertisement information related to the first message 130, the second message 140, and the personal information.

The output unit 1200 may output the content 150 generated by the controlling unit 1300, via the display unit 1210. According to an exemplary embodiment, the output unit 1200 may output the content 150 as the type as the second message 140, as illustrated in FIG. 5. Also, according to another exemplary embodiment, the output unit 1200 may display the content 150 in the input region 110 or by using a pop-up window. Also, the output unit 1200 may display the content 150 in a sound by using the sound output unit 1220, or may output the content 150 by using vibration generated in the vibration motor 1230.

The information generation unit 4020 may obtain the second message 140 or the personal information. The information generation unit 4020 may be formed as various types according to one or more exemplary embodiments. For example, when the second message 140 or the personal information is stored in the memory 1700, the information generation unit 4020 may include the memory 1700. Alternatively, when the second message 140 or the personal information is stored in an external device (not shown), such as a cloud server or a PIMS server, the information generation unit 4020 may include the communication unit 1500 for performing communication with the external device. Alternatively, the information generation unit 4020 may obtain the personal information from information that is input via the input unit 1100 or the A/V input unit 1600. Here, the personal information refers to information included in user's schedules, memos, contact information, location information, mails, SNSs, and calendars. The personal information may be information stored in a storage medium in the terminal 1000, or a cloud server or a PIMS server.

A sensing unit 1400 may sense a state of the terminal 1000 or a state of a surrounding environment of the terminal 1000 and transmit the sensed information to the controlling unit 1300. The sensing unit 1400 may include at least one selected from a magnetic sensor 1410, an acceleration sensor 1420, a temperature/humidity sensor 1430, an infrared sensor 1440, a gyroscope sensor 1450, a position sensor (for example, a GPS) 1460, an atmospheric sensor 1470, a proximity sensor 1480, and an illuminance sensor (RGB sensor) 1490. However, the sensing unit 1400 is not limited thereto. The function of each sensor may be understood by one of ordinary skill in the art in view of its name, and thus detailed descriptions will be omitted.

The communication unit 1500 may include one or more configurations for communication between the terminal 1000 and an external device. For example, the communication unit 1500 may include a short-range wireless communication unit (i.e., short-range wireless communicator) 1510, a mobile communication unit (i.e., mobile communicator) 1520, and a broadcasting receiving unit (i.e., broadcast receiver) 1530.

The short-range wireless communication unit 1510 may include a bluetooth communication unit, a bluetooth low energy (BLE) communication unit, a near-field communication unit, a WLAN communication unit, a zigbee communication unit, an infrared data association (IrDA) communication unit, a Wi-Fi direct (WFD) communication unit, an ultra wideband (UWB) communication unit, and an Ant+ communication unit. However, the short-range wireless communication unit 151 is not limited thereto.

The mobile communication unit 1520 exchanges wireless signals with at least one selected from a base station in a mobile communication network, an external terminal 1000, and a server. Here, the wireless signals may include sound call signals, internet protocol video call signals, or various types of data according to exchanging of text/multimedia messages.

The broadcasting reception unit 1530 receives broadcasting signals from the outside via broadcasting channels and/or information related to broadcasting. The broadcasting channels may include satellite channels and ground wave channels. According to one or more exemplary embodiments, the terminal 1000 may not include the broadcasting reception unit 1530.

The audio/video (A/V) input unit 1600 inputs audio signals or video signals, and may include a camera 1610 and a microphone 1620. The camera 1610 may obtain an image frame, such as a still image or a video, via an image sensor, in an internet protocol video mode or a photographing mode. The image captured via the image sensor may be processed via the controlling unit 1300 or an additional image processing unit (not shown).

The image frame processed in the camera 1610 may be stored in the memory 1700 or may be transmitted to the outside via the communication unit 1500. Two or more of the cameras 1610 may be included according to the types of the terminal 1000.

The microphone 1620 receives an input of an external sound signal and processes the external sound signal as electrical sound data. For example, the microphone 1620 may receive sound signals from an external device, a speaker, or a user. The microphone 1620 may use various noise elimination algorithms for removing noises generated in the process in which external sound signals are input.

The memory 1700 may store programs for processing and controlling the controlling unit 1300, and may store data that is input in the terminal 1000 or output from the terminal 1000.

The memory 1700 may include a storage medium of at least one selected from a flash memory type, a hard disk type, a multimedia card micro type, a card type memory (for example, SD or XD memory, etc.), random access memory (RAM), static random access memory (SRAM), read-only memory (ROM), electrically erasable programmable read-only memory (EEPROM), programmable read-only memory (PROM), a magnetic memory, a magnetic disk, and an optical disk.

Programs stored in the memory 1700 may be divided into a plurality of modules according to their functions. For example, the programs may be divided into a user interface (UI) module 1710, a touch screen module 1720, and a notifying module 1730.

The UI module 1710 may provide a specialized UI connected with the terminal 1000, for example, a graphic user interface (GUI), according to applications. The touch screen module 1720 may sense a touch gesture of a user on a touch screen, and may transmit information about the touch gesture to the controlling unit 1300. The touch screen module 1720 may recognize and analyze a touch code. The touch screen module 1720 may be formed as separate hardware including a controlling unit.

Various sensors may be included in the touch screen or around the touch screen to sense a touch or a proximity touch of the touch screen. An example of the sensor for sensing the touch of the touch screen is an antenna sensor. The antenna sensor refers to a sensor that senses a contact of a specific object, by a degree in which human beings sense or by a higher degree than the degree in which human beings sense. The antenna sensor may sense various information including a roughness of a contact surface, a rigidity of a contact object, and a temperature of a contact point.

Also, another example of the sensor for sensing the touch of the touch screen is the proximity sensor.

The proximity sensor refers to a sensor that senses an object that approaches a predetermined sensing surface or senses whether there is an object existing near the sensing surface by using an electromagnetic force or infrared rays, without a mechanical contact. Examples of the proximity sensor may include a transmittance photoelectricity sensor, a direct reflective photoelectricity sensor, a mirror-reflective photoelectricity sensor, a radio frequency oscillation proximity sensor, a capacitance proximity sensor, a magnetic proximity sensor, an infrared proximity sensor, etc. The touch gesture of the user may include tapping, touch & hold, double tapping, dragging, panning, flicking, drag and drop, and swiping.

The notifying module 1730 may generate signals for informing of an event occurrence of the terminal 1000. Examples of the event occurring in the terminal 1000 may include reception of call signals, reception of messages, occurrence of messages, inputting of key signals, and notifying of schedules. The notifying module 1730 may output a notifying signal as a video signal via the display unit 1210, as an audio signal via the sound output unit 1220, or as a vibration signal via the vibration motor 1230.

The above described device may be formed of a hardware component, a software component, and/or a combination of the hardware component and the software component. For example, the device and the components according to the one or more above exemplary embodiments may be embodied by using one or more general-purpose computers or special-purpose computers, such as a processor, a controller, an arithmetic logic unit (ALU), a digital signal processor, a microcomputer, a field programmable array (FPA), a programmable logic unit (PLU), a microprocessor, or any other devices which may execute and respond to instructions.

The processing device may perform the operating system (OS) and one or more software applications performed in the OS. Also, the processing device may access, store, manipulate, process, and generate data, in response to execution of software.

For convenience of understanding, descriptions may have been focused on a case in which one processing device is used. However, one of ordinary skill in the art would have understood that the processing device may include a plurality of processing elements and/or a processing element in a multiple number. For example, the processing device may include a plurality of processors, or one processor and one controller. Also, other processing configurations, such as a parallel processor, are also possible.

Software may include a computer program, a code, an instruction, or a combination thereof, and may configure the processing device to operate as desired or may individually or collectively instruct the processing device.

Software and/or data may be permanently or temporarily embodied as a type of a device, a component, physical equipment, virtual equipment, a computer recording medium or device, or transferred signal waves. The software may be stored or executed in a distributed manner in a computer system connected in a network. The software and/or data may be recorded in one or more computer-readable recording media.

The methods of the present disclosure may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the inventive concepts or may be known to and usable by one of ordinary skill in a field of computer software.

Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories).

Examples of the program commands include a high-level language code that may be executed by a computer using an interpreter as well as a machine language code made by a complier.

The above hardware devices may be configured to operate as one or more software modules to perform the operations of one or more exemplary embodiments, and vice versa.

As the disclosure allows for various changes and numerous embodiments, exemplary embodiments are illustrated in the drawings and described in detail in the disclosure. However, this is not intended to limit the disclosure to particular modes of practice, and it is to be appreciated that all changes, equivalents, and substitutes that do not depart from the spirit and technical scope of the inventive concepts are encompassed in the disclosure.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of providing content in a terminal, the method comprising:
   obtaining a first message that is input through a user interface of the terminal, wherein the user interface is provided by a messaging application that executes a messaging service in the terminal;
   extracting key elements from the first message and a second message stored in the terminal, the second message being obtained from a first user terminal that is different from the terminal, via the messaging application;
   receiving location information of the terminal and location information of the first user terminal, the location information of the first user terminal being identified based on location technology;
   determining a location recommendation based on the received location information of the terminal and the received location information of the first user terminal;
   generating content related to the first message and the second message based on the extracted key elements and the location recommendation;
   providing the generated content via the terminal; and
   determining an appointment place located in the location recommendation based on the extracted key elements and the location recommendation,
   wherein the location recommendation is a middle position between a location of the terminal and a location of the first user terminal, and the content comprises the appointment place.

2. The method of claim 1, wherein the content comprises at least one of text, a still image, a video and map information.

3. The method of claim 1, wherein the content comprises a map and guide information with respect to the received location information of the terminal and the received location information of the first user terminal.

4. The method of claim 1, wherein the content comprises an advertisement related to the extracted key elements.

5. The method of claim 4, further comprising:
   providing other content including an additional advertisement related to the advertisement included in the content via the terminal, when an input of selecting the content is received.

6. The method of claim 5, wherein when the advertisement included in the content comprises discount information related to the key elements, the additional advertisement in the other content comprises at least one of discount items, schedules, locations, or coupons information related to the discount information.

7. A terminal for providing content, the terminal comprising:
   a memory storing at least one program; and
   at least one controller configured to execute the at least one program to:
   obtain a first message that is input through a user interface of the terminal, wherein the user interface is provided by a messaging application that executes a messaging service in the terminal,
   extract key elements from the first message and a second message stored in the terminal, the second message being obtained from a first user terminal that is different from the terminal, via the messaging application;
   receive location information of the terminal and location information of the first user terminal, the location information of the first user terminal being identified based on location technology;
   determine a location recommendation based on the received location information of the terminal and the received location information of the first user terminal;
   generate the content related to the first message and the second message based on the extracted key elements and the location recommendation,
   provide the generated content via the terminal, and
   determine an appointment place located in the location recommendation based on the extracted key elements and the location recommendation,
   wherein the location recommendation is a middle position between a location of the terminal and a location of the first user terminal, and the content comprises the appointment place.

8. The terminal of claim 7, wherein the content comprises a map and guide information with respect to the location information.

9. The terminal of claim 7, wherein the content comprises an advertisement related to the extracted key elements.

10. The terminal of claim 9, wherein the at least one controller is further configured to execute the at least one program to:
    provide other content including an additional advertisement related to the advertisement included in the content via the terminal, when an input of selecting the content is received.

11. The terminal of claim 10, wherein when the advertisement included in the content comprises discount information related to the key elements, the additional advertisement in the other content comprises at least one of discount items, schedules, locations, or coupons information related to the discount information.

12. A non-transitory computer-readable recording medium having stored thereon a program that is executed by a computer to perform a method of providing content through a terminal, the method comprising:

obtaining a first message input through a user interface of the terminal, wherein the user interface is provided by a messaging application that executes a messaging service in the terminal;

extracting key elements from the first message and a second message stored in the terminal, the second message being obtained from a first user terminal that is different from the terminal, via the messaging application;

receiving location information of the terminal and location information of the first user terminal, the location information of the first user terminal being identified based on location technology;

determining a location recommendation based on the received location information of the terminal and the received location information of the first user terminal;

generating content related to the first message and the second message based on the extracted key elements and the location recommendation;

providing the generated content via the terminal; and determining an appointment place located in the location recommendation based on the extracted key elements and the location recommendation, wherein the location recommendation is a middle position between a location of the terminal and a location of the first user terminal and the content comprises the appointment place.

\* \* \* \* \*